(12) United States Patent
Yamada et al.

(10) Patent No.: US 8,933,610 B2
(45) Date of Patent: Jan. 13, 2015

(54) ROTOR AND MOTOR

(71) Applicant: ASMO Co., Ltd., Shizuoka-ken (JP)

(72) Inventors: Yoji Yamada, Hamamatsu (JP); Chie Morita, Kosai (JP); Seiya Yokoyama, Toyohashi (JP)

(73) Assignee: ASMO Co., Ltd., Shizuoka-ken (JP)

( * ) Notice: Subject to any disclaimer, the term of this patent is extended or adjusted under 35 U.S.C. 154(b) by 256 days.

(21) Appl. No.: 13/662,762

(22) Filed: Oct. 29, 2012

(65) Prior Publication Data

US 2013/0106208 A1 May 2, 2013

(30) Foreign Application Priority Data

Oct. 31, 2011 (JP) ................................. 2011-239517
Nov. 11, 2011 (JP) ................................. 2011-247668

(51) Int. Cl.
| | |
|---|---|
| *H02K 1/22* | (2006.01) |
| *H02K 1/27* | (2006.01) |
| *H02K 1/30* | (2006.01) |
| *H02K 16/02* | (2006.01) |
| *H02K 1/24* | (2006.01) |
| *H02K 21/04* | (2006.01) |

(52) U.S. Cl.
CPC *H02K 1/27* (2013.01); *H02K 1/243* (2013.01); *H02K 21/044* (2013.01); *H02K 1/30* (2013.01); *H02K 1/2706* (2013.01); *H02K 1/2713* (2013.01); *H02K 1/2766* (2013.01); *H02K 16/02* (2013.01)
USPC .................. 310/263; 310/156.66; 310/156.71

(58) Field of Classification Search
CPC ...... H02K 21/044; H02K 1/243; H02K 15/03

USPC .............................. 310/263, 156.66, 156.69, 310/156.71–156.73
See application file for complete search history.

(56) References Cited

U.S. PATENT DOCUMENTS

| | | | | |
|---|---|---|---|---|
| 4,959,577 | A | * | 9/1990 | Radomski ..................... 310/263 |
| 5,663,605 | A | | 9/1997 | Evans et al. |
| 6,455,978 | B1 | * | 9/2002 | Krefta et al. ................. 310/263 |
| 6,538,358 | B1 | * | 3/2003 | Krefta et al. ................. 310/263 |
| 7,569,968 | B2 | | 8/2009 | Nakamura |
| 7,737,602 | B2 | | 6/2010 | Harada |
| 7,750,529 | B2 | | 7/2010 | Tajima et al. |
| 8,624,459 | B2 | | 1/2014 | Tokizawa |
| 2003/0102758 | A1 | | 6/2003 | Kusase et al. |
| 2007/0046139 | A1 | * | 3/2007 | Ishizuka ....................... 310/263 |
| 2008/0018190 | A1 | | 1/2008 | Takahata et al. |
| 2008/0088199 | A1 | * | 4/2008 | Hamada ........................ 310/263 |

(Continued)

FOREIGN PATENT DOCUMENTS

| | | |
|---|---|---|
| JP | 5-43749 U | 6/1993 |
| JP | 9327139 | 12/1997 |

(Continued)

*Primary Examiner* — Thanh Lam
(74) *Attorney, Agent, or Firm* — Kilpatrick Townsend & Stockton LLP

(57) ABSTRACT

A rotor includes at least one of a group of one or more auxiliary magnets that are located between first and second claw poles in a circumferential direction and magnetized to be magnetic poles of the same polarity as the first and second claw poles and another group of one or more auxiliary magnets that are located on a rear side of the first and second claw poles and magnetized to have radially outer portions of the same polarity as the first and second magnetic poles. The auxiliary magnets are arranged to protrude beyond at least one of axial end surfaces of the first and second core bases.

14 Claims, 17 Drawing Sheets

(56) References Cited

U.S. PATENT DOCUMENTS

| | | |
|---|---|---|
| 2010/0148612 A1 | 6/2010 | Takemoto et al. |
| 2010/0226803 A1 | 9/2010 | Tajima et al. |
| 2013/0057102 A1* | 3/2013 | Yamada et al. .......... 310/156.07 |
| 2013/0069471 A1 | 3/2013 | Kadiri et al. |
| 2013/0106229 A1 | 5/2013 | Goto et al. |
| 2013/0106230 A1 | 5/2013 | Morita et al. |
| 2013/0113323 A1 | 5/2013 | Yamada et al. |
| 2013/0113329 A1 | 5/2013 | Yokoyama et al. |
| 2013/0121856 A1 | 5/2013 | Yamada et al. |
| 2013/0147288 A1 | 6/2013 | Jack et al. |
| 2013/0270928 A1 | 10/2013 | Nord |

FOREIGN PATENT DOCUMENTS

| | | |
|---|---|---|
| JP | 2012-115085 A | 6/2012 |
| WO | 2012/067223 | 5/2012 |

\* cited by examiner

To Front Side ←    To Rear Side →

ROTOR AND MOTOR

BACKGROUND

The present disclosure relates to a rotor and a motor.

A rotor used in a motor described in Japanese Laid-Open Utility Model Publication No. 5-43749 is provided with a pair of rotor cores each configured by combining a plurality of claw poles arranged in a circumferential direction. The rotor has a Lundell structure, in which field magnets are arranged between the claw poles and the rotor cores to produce a permanent magnet field that causes the individual claw poles to act as alternately opposite magnetic poles.

In this rotor, which has the Lundell structure, interpole magnets made of permanent magnets are arranged between each of the claw poles. As there is a risk that these interpole magnets may come off due to centrifugal force produced as a result of rotation of the rotor, the interpole magnets are individually fixed to the claw poles.

SUMMARY

If the rotor is provided with a separate sensor magnet for detecting the rotational position of the rotor, it is likely to increase the number of components.

Also, since it is necessary to fix and assemble the individual interpole magnets between the individual claw poles with significantly high accuracy, this will result in an increase in the number of assembly steps. If the number of components increases, it is difficult to fix the individual interpole magnets between the claw poles using a high-efficiency manufacturing method.

It is an objective of the disclosure to provide a rotor and a motor that reduce the number of components.

It is a further objective of the disclosure to provide a rotor and a motor that realize a simple arrangement that prevent interpole magnets arranged between each of the claw poles formed at equal intervals in a circumferential direction of the rotor from coming off as a result of rotation.

In accordance with one aspect of the present disclosure, a rotor is provided that includes a first rotor core, a second rotor core, and a filed magnet. The first rotor core has a substantially disk-like first core base and a plurality of first claw poles located at equal intervals around an outer circumference of the first core base. The first claw poles project radially outward and extending in an axial direction. The second rotor core has a substantially disk-like second core base and a plurality of second claw poles located at equal intervals around an outer circumference of the second core base. The second claw poles project radially outward and extending in the axial direction. The second claw poles are each located between corresponding ones of the first claw poles of the first rotor core. The field magnet is placed between the first core base and the second core base in the axial direction. The field magnet is magnetized in the axial direction so that the first claw poles function as first magnetic poles and the second claw poles function as second magnetic poles. The rotor further includes at least one of a group of one or more auxiliary magnets that are each located between first and second claw poles in a circumferential direction and magnetized to be magnetic poles of the same polarity as the first and second claw poles and another group of one or more auxiliary magnets that are each located on a rear side of the first and second claw poles and magnetized to have radially outer portions of the same polarity as the first and second magnetic poles. The auxiliary magnets are arranged to protrude beyond at least one of axial end surfaces of the first core base and the second core base.

According to this aspect of the disclosure, the rotor includes at least one of a group of one or more auxiliary magnets that are each located between first and second claw poles in the circumferential direction and magnetized to be magnetic poles of the same polarity as the first and second claw poles and another group of one or more auxiliary magnets that are located on the rear side of the first and second claw poles and magnetized to have radially outer portions of the same polarity as the first and second magnetic poles. Since the auxiliary magnets protrude beyond at least one of the axial end surfaces of the first and second claw poles, it is possible to detect the rotational position of the rotor without providing the rotor with any additional sensing magnet if a motor is provided with a sensor arranged to face protruding portions of the auxiliary magnets in the axial direction, for example. This arrangement serves to reduce the number of components.

In accordance with another aspect, the auxiliary magnets are interpole magnets each located between first and second claw poles in the circumferential direction and magnetized to be magnetic poles of the same polarity as the first and second claw poles.

According to this aspect of the disclosure, the interpole magnets located between the first and second claw poles in the circumferential direction and magnetized to become magnetic poles of the same polarity as the first and second claw poles also function as sensing magnets. The provision of the interpole magnets serves to reduce leakage flux, which may potentially occur between each of the claw poles and improve motor output.

In accordance with another aspect, the auxiliary magnets are rear-side magnets located on the rear side of the first claw poles or the second claw poles and magnetized to have radially outer portions of the same polarity as the first claw poles or the second claw poles.

According to this aspect of the disclosure, the rear-side magnets located on the rear side of the first and second claw poles and magnetized to have radially outer portions of the same polarity as the first and second claw poles also function as sensing magnets. The provision of the rear-side magnets serves to reduce leakage flux, which may potentially occur between each of the first and second claw poles and the corresponding field magnet and improve motor output.

In accordance with another aspect, the rotor further includes a fixing member. The auxiliary magnets each have a portion protruding beyond at least one of the axial end surfaces of the first core base and the second core base, and the fixing member fixes the protruding portions.

According to this aspect of the disclosure, the portion of each of the auxiliary magnets protruding from the rotor is fixed by the fixing member, so that the auxiliary magnets are kept from coming off the rotor as a result of rotation thereof.

In accordance with another aspect, the fixing member is made of plastic and formed by plastic-molding the protruding portions of the auxiliary magnets extending beyond the core base.

According to this aspect of the disclosure, each portion of the auxiliary magnets protruding from the rotor is fixed by the plastic. This prevents exposure of the interpole magnets and keeps the auxiliary magnets from coming off the rotor as a result of rotation thereof.

In accordance with another aspect, the fixing member is provided only on each of axial end surfaces of the rotor, and the protruding portions extending beyond the core base are fixed by the fixing member.

According to this aspect of the disclosure, the fixing member is provided only on each of the axial end surfaces of the rotor, creating no protrusions in the axial direction of the rotor. This reduces the thickness of an air gap between a stator and the rotor, and improves motor output.

In accordance with another aspect, the fixing member is a fixing plate and the protruding portions of the auxiliary magnets protruding beyond the core base are fixed by the fixing plate on an axial end surface of the rotor.

According to this aspect of the disclosure, the portion of each of the auxiliary magnets protruding from the rotor is fixed by the fixing plate, so that the auxiliary magnets are kept from coming off the rotor as a result of rotation thereof in a reliable fashion.

In accordance with another aspect, the fixing plate is made of a nonmagnetic material and the protruding portions of the auxiliary magnets extending beyond the core base are fixed by the fixing plate on at least one of axial end surfaces of the rotor.

According to this aspect of the disclosure, the fixing plate is made of a nonmagnetic material. This makes it possible to prevent leakage flux, yet keeping the auxiliary magnets from coming off the rotor as a result of rotation thereof. Also, since the fixing plate is a discrete one-piece component provided on each of the first and second rotor cores, it is possible to achieve a cost reduction with a reduced number of components.

In accordance with another aspect, the fixing plate is made of a magnetic material and protruding portions of interpole magnets extending from the rotor are fixed by the fixing plate on at least one of axial end surfaces of the rotor.

According to this aspect of the disclosure, the fixing plate is made of a magnetic material. This makes it possible to improve motor output by enlarging a magnetic circuit and reducing reluctance. Also, since the fixing plate is made of a magnetic material, the fixing plate can function as part of each of the first and second rotor cores, thereby enabling adjustment of the length of the rotor in the axial direction.

In accordance with another aspect, the fixing plate is made of a magnet and the protruding portions extending from the rotor are fixed by the fixing plate on at least one of the axial end surfaces of the rotor.

According to this aspect of the disclosure, the fixing plate is made of a magnet, making it possible to prevent leakage flux as well.

In accordance with another aspect, a tandem-structured rotor is provided that is formed by stacking a plurality of the above described rotors. The protruding portions of the auxiliary magnets extending between the stacked rotors are fixed by the fixing member.

In accordance with another aspect, a tandem-structured rotor is provided that is formed by stacking a plurality of the above described rotors. The protruding portions of the auxiliary magnets extending from the stacked rotors are fixed by the fixing member on least one of axial end surfaces of the rotor.

According to this aspect of the disclosure, it is possible to configure a rotor by stacking a plurality of rotors in which the interpole magnets are reliably kept from coming off the rotor, the rotor having a capability to produce high torque.

In accordance with another aspect, a motor is provided that includes the above described rotor and a sensor for detecting the auxiliary magnets.

This aspect of the disclosure makes it possible to provide a motor manufactured with a reduced number of components.

In accordance with another aspect, a motor including the above described motor is provided.

This aspect of the disclosure makes it possible to obtain a compact, high-output motor.

Other aspects and advantages of the discloser will become apparent from the following description, taken in conjunction with the accompanying drawings, illustrating by way of example the principles of the disclosure.

BRIEF DESCRIPTION OF THE DRAWINGS

The features of the present disclosure that are believed to be novel are set forth with particularity in the appended claims. The disclosure, together with objects and advantages thereof, may best be understood by reference to the following description of the presently preferred embodiments together with the accompanying drawings in which:

DESCRIPTION OF THE PREFERRED EMBODIMENTS

First Embodiment

A first embodiment of the present disclosure will be described hereunder with reference to FIGS. 1 to 3.

Figure 1:
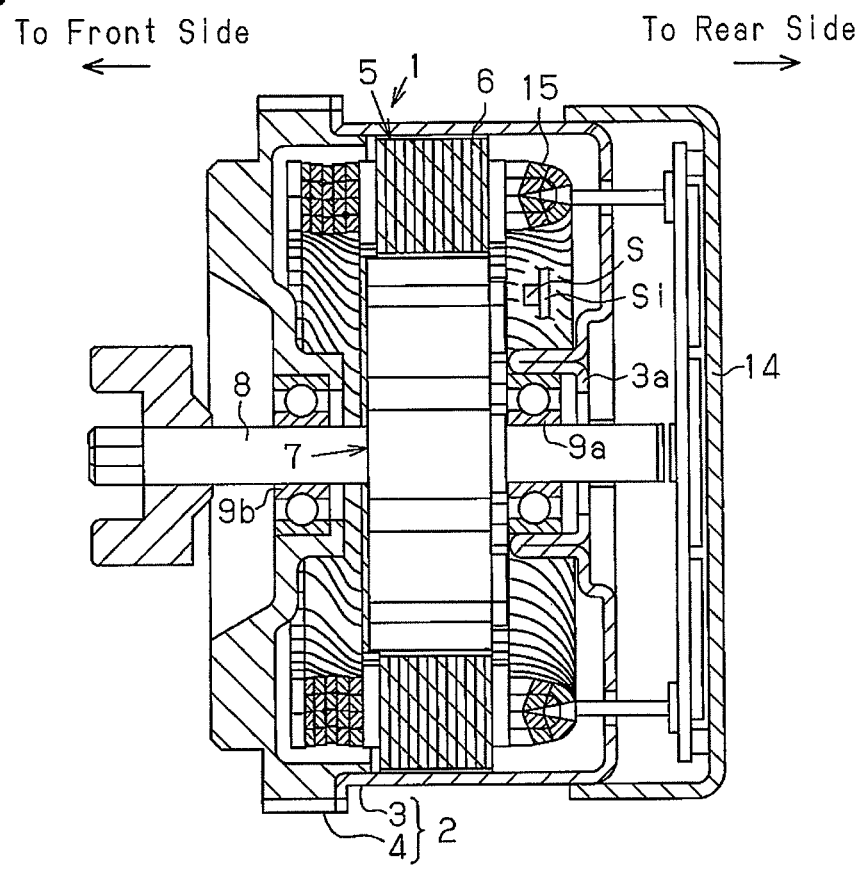
FIG. 1 is a cross-sectional view of a motor according to a first embodiment.

As depicted in FIG. 1, a motor case 2 of a motor 1 includes a case housing 3 formed into a cylindrical shape having a closed end and a front cover 4, which closes an opening of the case housing 3 on a front side thereof (left side as illustrated in FIG. 1). A circuitry accommodating box 14, which accommodates a power supply circuit such as a circuit board, for example, is mounted on a rear side (right side as illustrated in FIG. 1) of the case housing 3.

A stator 5 is fixed to an inner circumferential surface of the case housing 3. The stator 5 includes a stator core 6 having a plurality of teeth extending radially inward, and segment conductor (SC) windings 15 wound around the individual teeth of the stator core 6. A rotor 7 of the motor 1 provided with a rotary shaft 8 is located inside the stator 5. The rotary shaft 8 is a nonmagnetic metal shaft, which is rotationally supported by a bearing 9a held on a bottom 3a of the case housing 3 and a bearing 9b held on the front cover 4.

Figure 2:
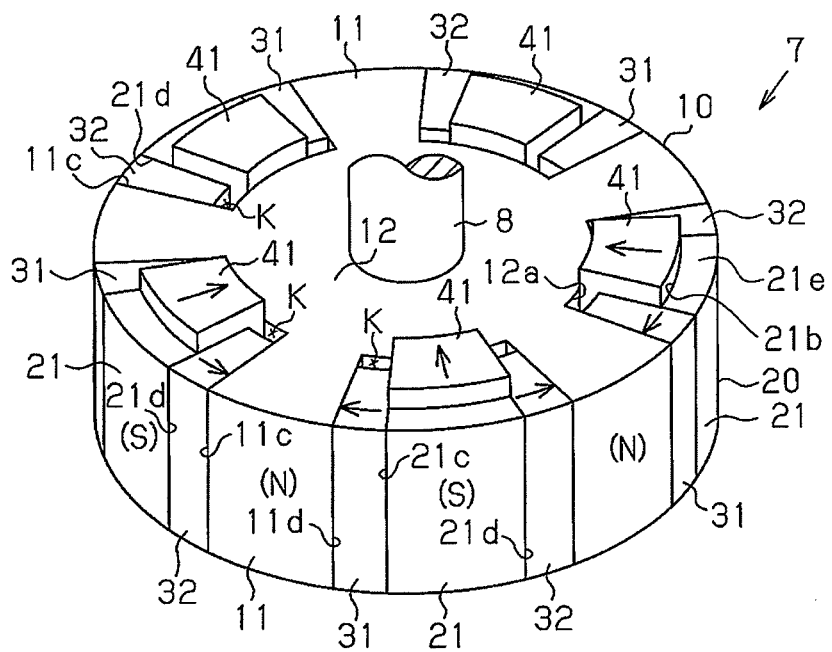
FIG. 2 is a perspective view of a rotor of FIG. 1.
Figure 3:
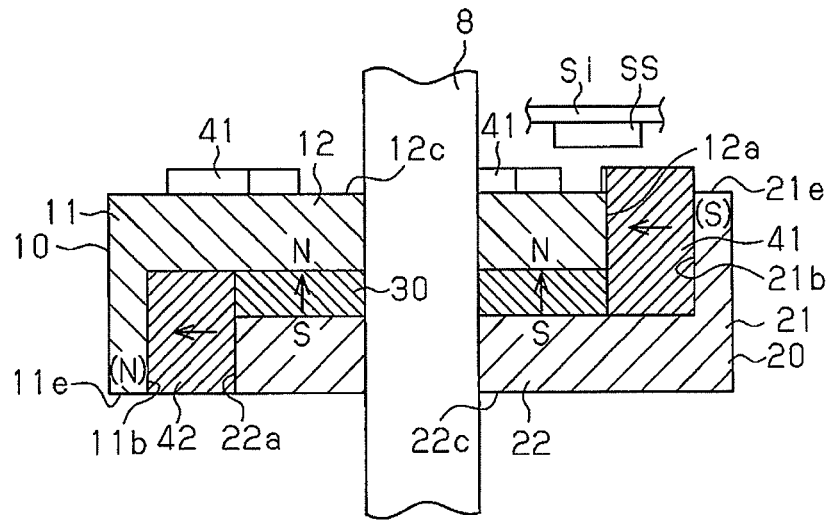
FIG. 3 is a cross-sectional view of the rotor of FIG. 1.

As depicted in FIGS. 2 and 3, the rotor 7 includes first and second rotor cores 10, 20, an annular magnet 30, which serves as a field magnet, first and second rear-side auxiliary magnets 41, 42, which serve as rear-side magnets, and first and second interpole magnets 31, 32. Arrows indicated by solid lines in FIGS. 2 and 3 denote magnetization directions of the individual magnets 30, 31, 32, 41, 42 directed from the south pole to the north pole.

As depicted in FIG. 2, the first rotor core 10 is provided with a plurality of first claw poles 11, which are formed at equal intervals around an outer circumference of a substantially disk-like first core base 12. The first claw poles 11 project radially outward and extend in an axial direction. In this embodiment, the first rotor core 10 has five first claw poles 11. A first side surface 11c and a second side surface 11d of each of the first claw poles 11 constitute flat planes that extend radially and are not inclined relative to the radial directions as viewed in the axial direction. Each of the first claw poles 11 has a sectorial cross section that is perpendicular to the axial direction. The angle of each first claw pole 11 in a circumferential direction, or the angle between the first side surface 11c and the second side surface 11d, is made smaller than the angular distance between any two of the first claw poles 11 that are adjacent to each other in the circumferential direction. The first and second interpole magnets 31, 32 and the first and second rear-side auxiliary magnets 41, 42 function as auxiliary magnets.

As depicted in FIGS. 2 and 3, the second rotor core 20 has the same shape as the first rotor core 10. A plurality of second claw poles 21 are formed at equal intervals around an outer circumference of a substantially disk-like second core base 22. The second claw poles 21 project radially outward and extend in the axial direction. A first side surface 21c and a second side surface 21d of each of the second claw poles 21 constitute flat planes extending radially. Each of the second claw poles 21 has a sectorial cross section that is perpendicular to the axial direction. The angle of each second claw pole 21 in the circumferential direction, or the angle between the first side surface 21c and the second side surface 21d, is made smaller than the angular distance between any two of the second claw poles 21 that are adjacent to each other in the circumferential direction. The second rotor core 20 is assembled with the first rotor core 10 such that the second claw poles 21 are arranged between the corresponding first claw poles 11, and the annular magnet 30 depicted in FIG. 3 is sandwiched between the first core base 12 and the second core base 22 in the axial direction. The first claw poles 11 and the second claw poles 21 are formed such that the second side surface 11d on one side of each first claw pole 11 becomes substantially parallel to the first side surface 21c on the facing side of the adjacent second claw pole 21 in the axial direction. Therefore, the gap between the second side surface 11d of each first claw pole 11 and the first side surface 21c of the adjacent second claw pole 21 is formed into a substantially linear, or narrow and elongate, shape extending in the axial direction. Also, the first claw poles 11 and the second claw poles 21 are formed such that the second side surface 11c on one side of each first claw pole 11 becomes substantially parallel to the second side surface 21d on the facing side of the adjacent second claw pole 21 in the axial direction. Therefore, the gap between the first side surface 11c of each first claw pole 11 and the second side surface 21d of the adjacent second claw pole 21 is formed into a substantially linear, or narrow and elongate, shape extending in the axial direction.

As depicted in FIG. 3, the outside diameter of the annular magnet 30 is made equal to that of the first core base 12 and the second core base 22. The annular magnet 30 is magnetized in the axial direction such that the first claw poles 11 function as first magnetic poles and the second claw poles 21 function as second magnetic poles. In this embodiment, the first magnetic poles are north poles and the second magnetic poles are south poles.

Each of the second rear-side auxiliary magnets 42 is located between an inner peripheral surface 11b, or a surface located radially inward, of each first claw pole 11 and an outer peripheral surface 22a of the second core base 22. As is the case with the second rear-side auxiliary magnets 42, each of the first rear-side auxiliary magnets 41 is located on an inner peripheral surface 21b of the relevant second claw pole 21. The second rear-side auxiliary magnets 42 each has a sectorial cross section that is perpendicular to the axial direction. The second rear-side auxiliary magnets 42 are magnetized such that portions that contact the inner peripheral surfaces 11b of the first claw poles 11 and portions that contact the first core base 12 become north poles. The first rear-side auxiliary magnets 41 are magnetized such that portions that contact the second core base 22 and portions that contact the inner peripheral surfaces 21b of the second claw pole 21 become south poles.

The lengths of the first rear-side auxiliary magnets 41 and the second rear-side auxiliary magnets 42 in the axial direction thereof are determined such that the first rear-side auxiliary magnets 41 and the second rear-side auxiliary magnets 42 overlap respectively as viewed in the axial direction at a position of the rotor 7 in the axial direction thereof where the annular magnet 30 is located, that is, as viewed from either of axial end surfaces of the rotor 7 up to a point where the annular magnet 30 extend in the axial direction.

The first rear-side auxiliary magnets 41 are each structured to project beyond an opposed surface 12c of the first core base 12 that extends in a direction opposite to the second core base 22, and beyond an extreme end surface 21e of each of the second claw poles 21 in the axial direction as illustrated in FIG. 3.

As depicted in FIG. 2, the first and second interpole magnets 31, 32 are arranged in gaps in the circumferential direction between the first claw poles 11 and the respective second claw poles 21. More specifically, each of the first interpole magnets 31 of this embodiment is arranged between the first side surface 11c of each first claw pole 11 on one side and the second side surface 21d of the adjacent second claw pole 21 on the other side. Each of the other second interpole magnets 32 is arranged between the second side surface 11d of each first claw pole 11 on the other side and the first side surface 21c of the adjacent second claw pole 21 on one side. The first and second interpole magnets 31, 32 are magnetized in the circumferential direction such that portions of the same polarity of the first claw pole 11 and the adjacent second claw pole 21 are oriented face to face with each other, or such that a portion of the second claw pole 21 close to the first claw pole 11 becomes a north pole and a portion of the first claw pole 11 close to the second claw pole 21 becomes a south pole. Air gaps K for preventing leakage flux are formed radially inside the first and second interpole magnets 31, 32 at locations close to the rotary shaft 8.

The motor 1 of the present embodiment is provided with a sensor SS for detecting the rotational position of the rotor 7. The sensor SS is supported by the stator 5 by means of a supporting member Si depicted in FIGS. 1 and 3. The sensor SS is so arranged as to face the first rear-side auxiliary magnets 41 at part of a path along which the first rear-side auxiliary magnets 41 pass when the rotor 7 rotates. The sensor SS is configured to determine the rotational position of the rotor 7 by detecting magnetism produced by each of the first rear-side auxiliary magnets 41. The sensor SS is electrically connected to an unillustrated control circuit provided in the circuitry accommodating box 14 and outputs information on the rotational position of the rotor 7. Thus, the control circuit can control rotation of the rotor 7 and the motor 1 on the basis of the rotational position information.

When a driving current is fed into the segment conductor (SC) windings 15 through a power supply circuit provided in the circuitry accommodating box 14 in the motor 1 configured as described above, a magnetic field for rotating the rotor 7 within the stator 5 is generated so that the rotor 7 is driven to rotate.

The operation of the motor 1 is described below.

The rotor 7 of the motor 1 of the present embodiment is configured so that the first rear-side auxiliary magnets 41 protrude farther than the opposed surface 12c of the first core base 12 and farther than the extreme end surfaces 21e of the second claw poles 21 in the axial direction. The sensor SS is so arranged as to face the individual first rear-side auxiliary magnets 41 at part of the rotating path of the first rear-side auxiliary magnets 41 in the axial direction. Thus, the sensor SS determines the rotational position of the rotor 7 by detecting the first rear-side auxiliary magnets 41 as sensing magnets that project in the axial direction.

Described below are characteristic advantages of the present embodiment.

(1) The rotor 7 is provided with the first rear-side auxiliary magnets 41 serving as auxiliary magnets that are located inside the inner peripheral surfaces 11b of the first claw poles 11 and are magnetized to become radially outer portions having the same polarity as the first magnetic poles. The first rear-side auxiliary magnets 41 are arranged to protrude farther than the opposed surface 12c, which constitutes an axial end surface of the first core base 12. It is therefore possible to detect the rotational position of the rotor 7 with the aid of the sensor SS, which is so arranged on the stator 5 as to face the first rear-side auxiliary magnets 41 in the axial direction, for example, without providing the rotor 7 with any additional sensing magnet. This arrangement serves to reduce the number of components.

(2) The provision of the first interpole magnets 31 and the second interpole magnets 32 serves to reduce leakage flux that may potentially occur between the adjacent first and second claw poles 11, 21, thereby improving the motor output.

(3) The provision of the first rear-side auxiliary magnets 41 and the second rear-side auxiliary magnets 42 serves to reduce leakage flux that may potentially occur between the first and second claw poles 11, 21 and the field magnet 30, thereby improving the motor output.

The first embodiment thus far disclosed may be modified as described below.

Although the motor 1 is configured such that the first rear-side auxiliary magnets 41 protrude farther than the opposed surface 12c of the first core base 12, or farther than an end surface of the first rotor core 10, in the axial direction in the foregoing embodiment, the disclosure is not limited thereto. For example, the motor 1 may be reconfigured such that the second rear-side auxiliary magnets 42 protrude farther than an opposed surface 22c of the second core base 22. In this case, the sensor SS is arranged on the stator 5 to face the second rear-side auxiliary magnets 42 in the axial direction in part of a rotating path of the second rear-side auxiliary magnets 42 when the rotor 7 rotates.

Figure 4:
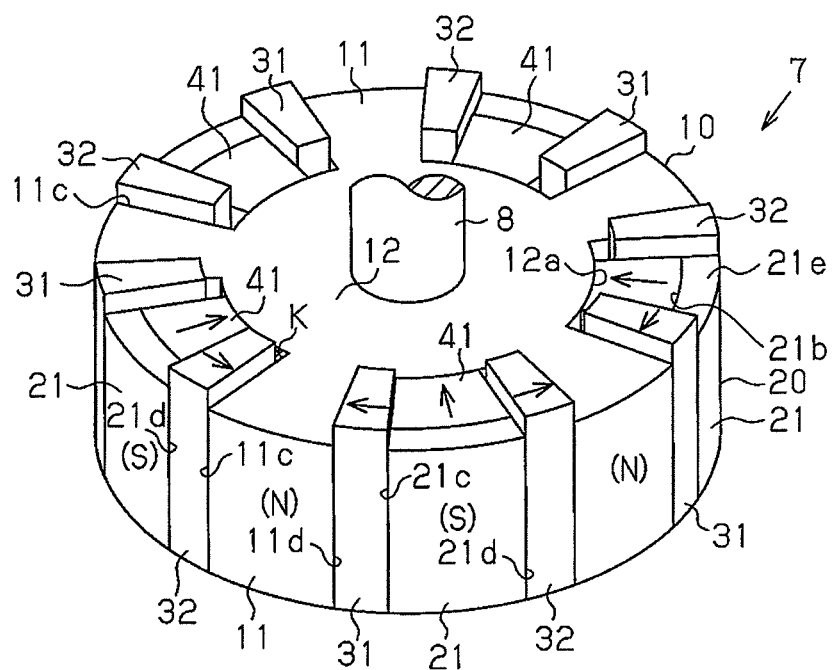
FIG. 4 is a perspective view of a rotor in one modification.

The motor 1 may be reconfigured such that the first interpole magnets 31 and the second interpole magnets 32, rather than the first rear-side auxiliary magnets 41 and the second rear-side auxiliary magnets 42, protrude farther than the opposed surface 12c of the first core base 12 or the opposed surface 22c of the second core base 22 as illustrated in FIG. 4. In this case, the sensor SS is arranged on the stator 5 to face the first and second interpole magnets 31, 32 in the axial direction in part of a rotating path of the first and second interpole magnets 31, 32 when the rotor 7 rotates.

Figure 5:
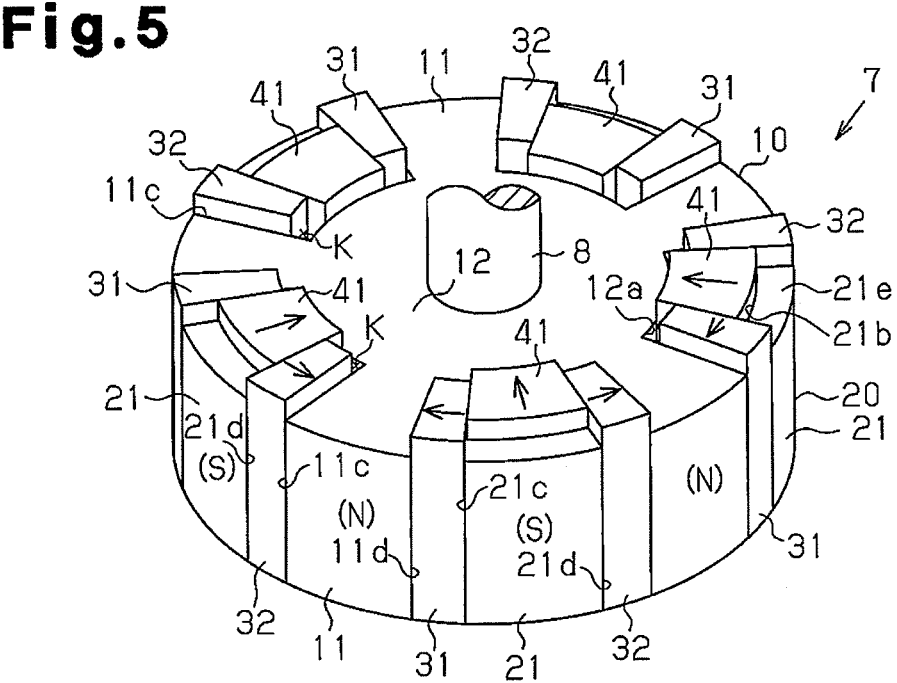
FIG. 5 is a perspective view of a rotor in another modification.

The motor 1 may be reconfigured such that, besides the first rear-side auxiliary magnets 41, the first and second interpole magnets 31, 32 also protrude farther than the opposed surface 12c of the first core base 12 or the opposed surface 22c of the second core base 22 as illustrated in FIG. 5.

Figure 6:
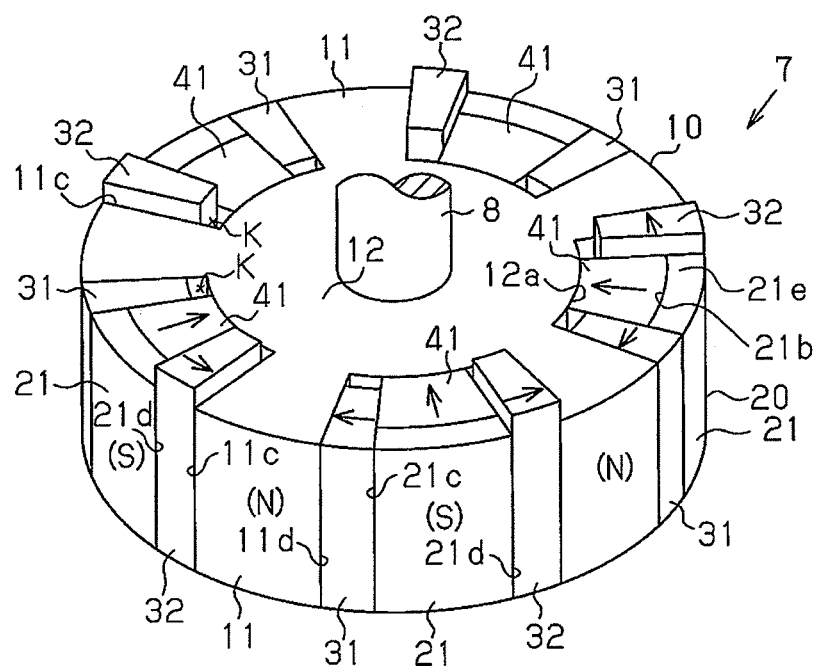
FIG. 6 is a perspective view of a rotor in still another modification.

The motor 1 may also be reconfigured such that the first interpole magnets 31 or the second interpole magnets 32, rather than the first rear-side auxiliary magnets 41 or the second rear-side auxiliary magnets 42, protrude farther than the opposed surface 12c of the first core base 12 or the opposed surface 22c of the second core base 22 as illustrated in FIG. 6. In this case, the sensor SS is arranged on the stator 5 to face the first and second interpole magnets 31, 32 in the axial direction in part of the rotating path of the first and second interpole magnets 31, 32 when the rotor 7 rotates.

Although the single annular magnet 30 is located between the first rotor core 10 and the second rotor core 20 in the foregoing embodiment, the disclosure is not limited thereto. For example, the motor 1 may be reconfigured such that a plurality of separate permanent magnets are located between the first and second core bases 12, 22 of the first and second rotor cores 10, 20 in an axial direction and around the rotary shaft 8.

Although not specifically mentioned in the foregoing discussion of the first embodiment, the first rotor core 10, the second rotor core 20 and the stator core 6 may be reconfigured by laminating magnetic metal sheets or molding magnetic powder, for example.

Second Embodiment

A second embodiment of the present disclosure will now be described hereunder with reference to FIGS. 7 to 13.

Figure 7:
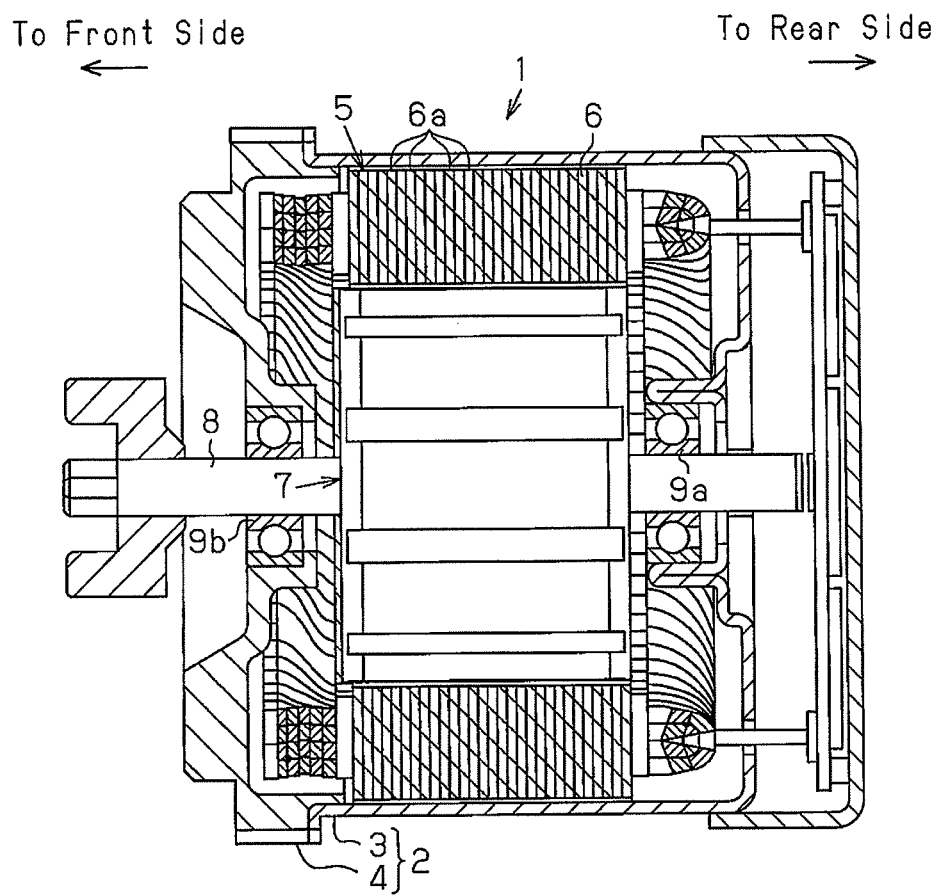
FIG. 7 is a cross-sectional view of a brushless motor according to a second embodiment.

Referring to FIG. 7, a motor case 2 of a brushless motor 1 includes a case housing 3 formed into a cylindrical shape having a closed end and a front cover 4, which closes an opening of the case housing 3 on a front side thereof. A stator 5 is fixed to an inner circumferential surface of the case housing 3. A stator core 6 of the stator 5 is formed by laminating a plurality of stator core pieces 6a made of steel sheets.

As depicted in FIG. 7, a rotor 7 located inside the stator 5 is firmly fitted on a rotary shaft 8, which is a nonmagnetic metal shaft in this embodiment. The rotary shaft 8 is rotationally supported by a bearing 9a provided at a bottom of the case housing 3 and a bearing 9b provided on the front cover 4. The rotor 7 fixedly mounted on the rotary shaft 8 has a Lundell structure.

Figure 8:
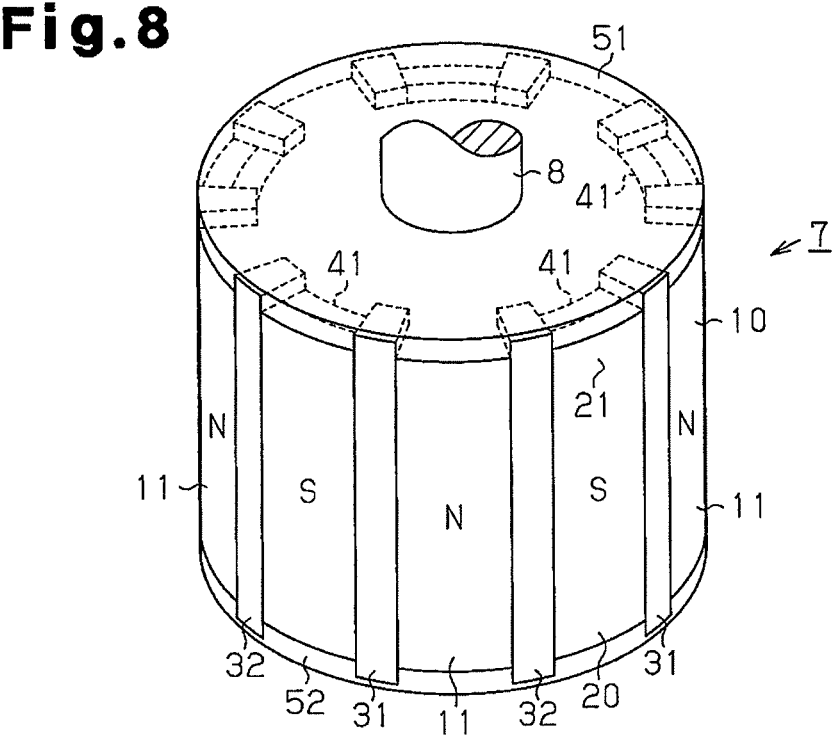
FIG. 8 is a perspective view representing, in particular, a first rotor core of a rotor of FIG. 7.
Figure 9:
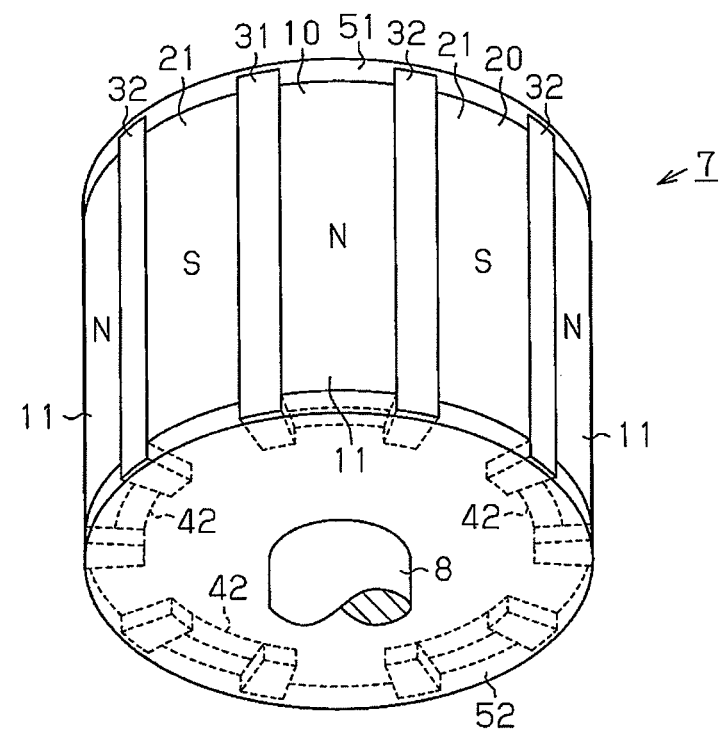
FIG. 9 is a perspective view representing, in particular, a second rotor core of the rotor of FIG. 7.
Figure 11:
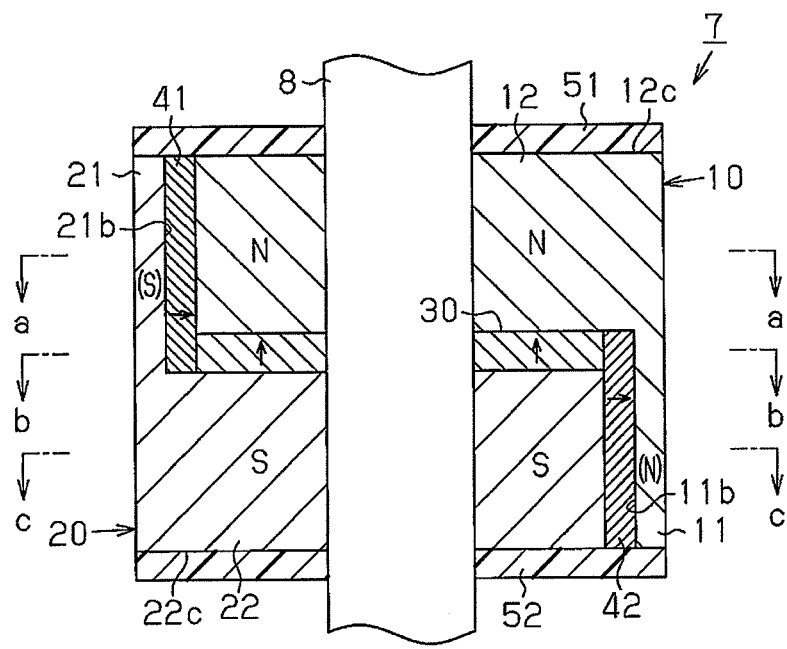
FIG. 11 is a cross-sectional view of the rotor depicted in FIG. 8.
Figure 12B:
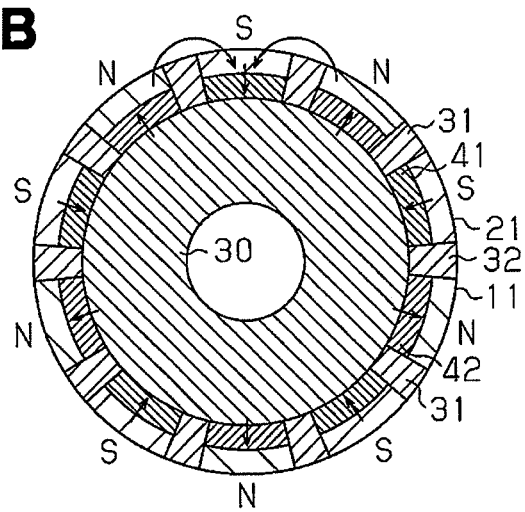
FIG. 12B is a cross-sectional view taken along lines b-b of FIG. 11.
Figure 13:
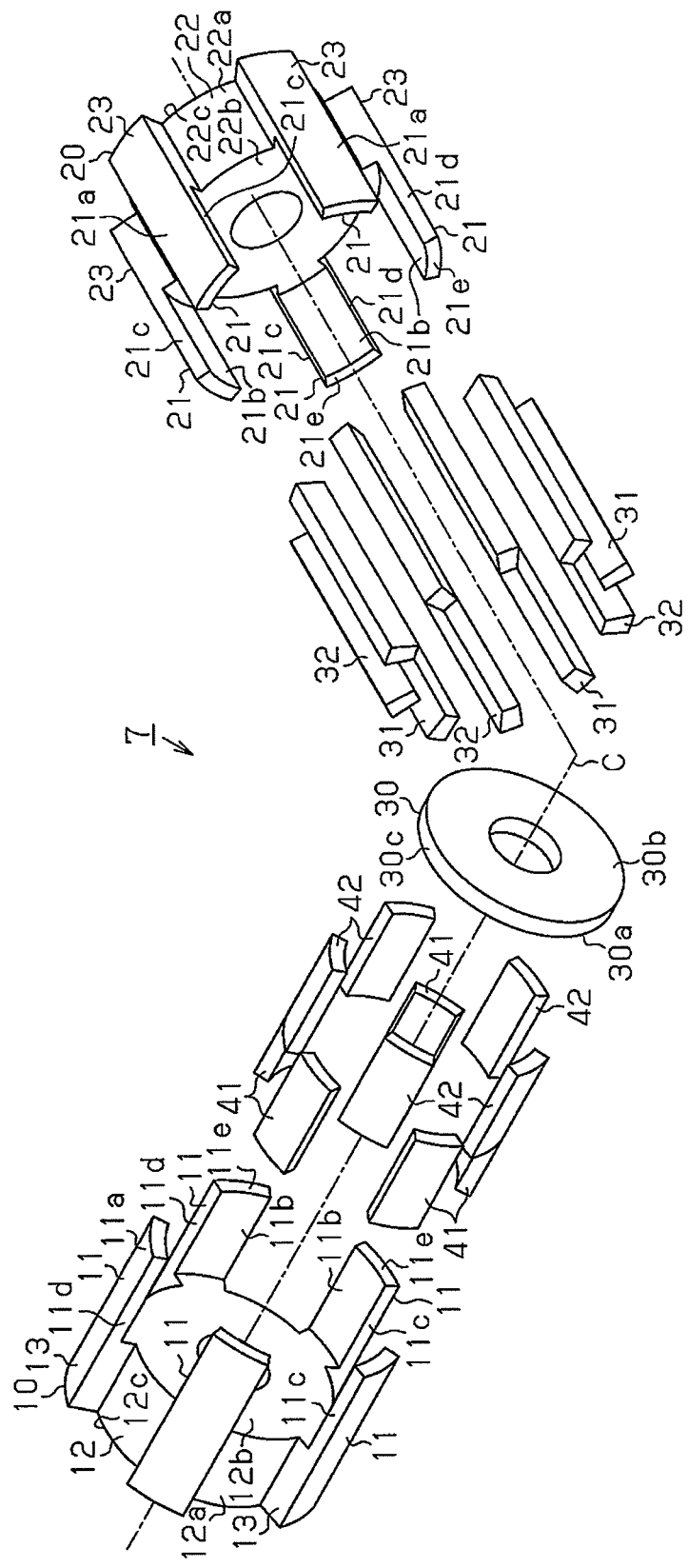
FIG. 13 is an exploded perspective view of the rotor depicted in FIG. 8.

As depicted in FIGS. 8, 9 and 13, the rotor 7 includes a first rotor core 10, a second rotor core 20 arranged to face the first rotor core 10, and an annular magnet 30 arranged between the first rotor core 10 and the second rotor core 20. The annular magnet 30 is illustrated in FIGS. 11, 12B and 13.

<First Rotor Core 10>

As depicted in FIG. 13, the first rotor core 10, which includes a first core base 12, is fixedly mounted on the rotary shaft 8.

Radially extending five first arms 13 are formed at equal intervals on an outer peripheral surface 12a of the first core base 12. A plurality of first claw poles 11 are formed to extend in an axial direction from the distal ends of the first arms 13 toward the second rotor core 20.

That is, the first rotor core 10 is so structured that the first claw poles 11 extend from the five first arms 13 formed on the first core base 12 toward the second rotor core 20.

The first claw poles 11 are formed such that each of the first claw poles 11 has a width smaller than the interval from one first claw pole 11 to the next as measured in the circumferential direction. The first claw poles 11 thus configured are arranged in the circumferential direction of the first core base 12 to form a comb-like structure extending in the axial direction.

Figure 10:
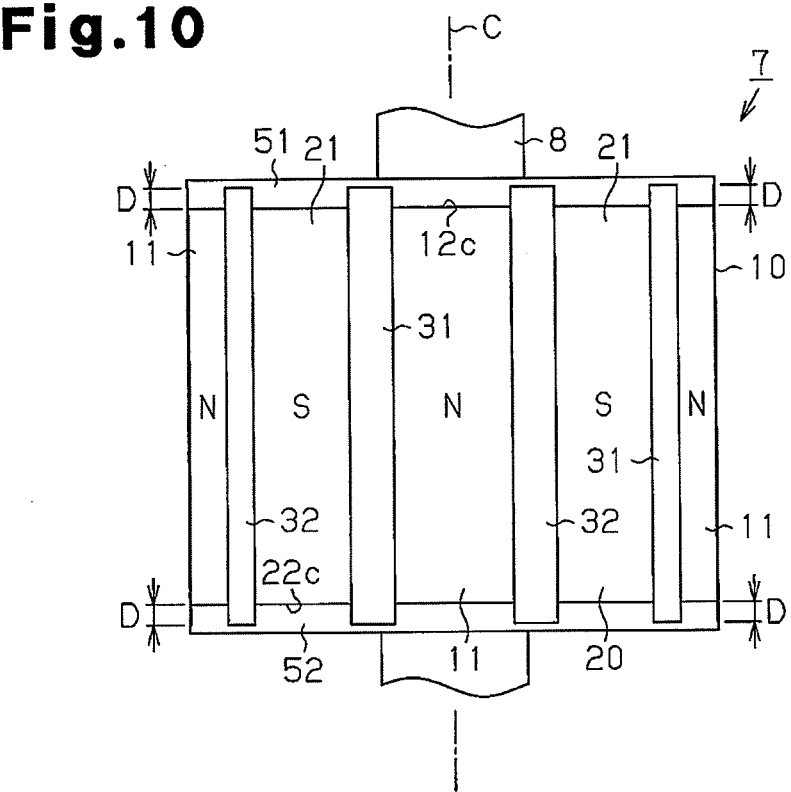
FIG. 10 is a front view of the rotor depicted in FIG. 8.

Each of the first claw poles 11 has a sectorial shape as viewed in the axial direction. Outer peripheral surfaces 11a and inner peripheral surfaces 11b of the first claw poles 11 each constitute part of a circle that is concentric with the first core base 12. The inside diameter of the inner peripheral surfaces 11b is larger than the outside diameter of the first core base 12. Referring to FIG. 13, each of the first claw poles 11 has a first side surface 11c located in a clockwise direction and a second side surface 11d located in a counterclockwise direction as seen from the side of the second rotor core 20. The first side surface 11c and the second side surface 11d individually form flat planes extending parallel to a central axis C of the rotary shaft 8. The individual first claw poles 11 have a rectangular shape elongate in the axial direction as viewed in radial directions as depicted in FIG. 10.

<Second Rotor Core 20>

The second rotor core 20 which has a second core base 22 as depicted in FIG. 13 is fixedly mounted on the rotary shaft 8.

Radially extending five second arms 23 are formed at equal intervals on an outer peripheral surface 22a of the second core base 22. A plurality of second claw poles 21 are formed to extend in the axial direction from distal ends of the individual second arms 23 toward the first rotor core 10.

That is, the second rotor core 20 is so structured that the second claw poles 21 extend from the five second arms 23 formed on the second core base 22 toward the first rotor core 10.

The second claw poles 21 are formed such that each of the second claw poles 21 has a width smaller than the interval from one second claw pole 21 to the next as measured in the circumferential direction. The second claw poles 21 thus configured are arranged in the circumferential direction of the second core base 22 to form a comb-like structure extending in the axial direction.

Each of the second claw poles 21 has a sectorial shape as viewed in the axial direction. Outer peripheral surfaces 21a and inner peripheral surfaces 21b of the second claw poles 21 each constitute part of a circle that is concentric with the second core base 22. The inside diameter of the inner peripheral surfaces 21b of the second claw poles 21 is larger than the outside diameter of the second core base 22. Referring to FIG. 13, each of the second claw poles 21 has a first side surface 21c located in the clockwise direction and a second side surface 21d located in the counterclockwise direction as seen from the side of the first rotor core 10. The first side surface 21c and the second side surface 21d individually form flat planes extending parallel to the central axis C of the rotary shaft 8. The individual second claw poles 21 have a rectangular shape elongate in the axial direction as viewed in the radial directions as depicted in FIG. 10.

The first side surfaces 21c of any two of the second claw poles 21 facing each other are oriented substantially parallel to each other. Similarly, the second side surfaces 21d of any two of the second claw poles 21 facing each other are oriented substantially parallel to each other.

The first rotor core 10 and the second rotor core 20 are assembled together with the annular magnet 30 placed in between as depicted in FIG. 11. Specifically, the first rotor core 10 and the second rotor core 20 are fitted to each other such that the claw pole 21 of the second rotor core 20 extending in the axial direction are individually located between the adjacent first claw poles 11 of the first rotor core 10. The width of each first claw pole 11 measured in the circumferential direction is smaller than the interval between any two adjacent second claw poles 21 and the width of each second claw pole 21 measured in the circumferential direction is smaller than the interval between any two adjacent first claw poles 11. Therefore, each of the first claw poles 11 is separated from each of the adjacent second claw poles 21.

Under conditions where the first rotor core 10, and the second rotor core 20 are fixed together with the annular magnet 30 placed in between, the first rotor core 10 and the second rotor core 20 are configured such that extreme end surfaces 11e of the first claw poles 11 constituting axial end surfaces thereof lie in the same plane as an opposed surface 22c of the second core base 22 and that extreme end surfaces 21e of the second claw poles 21 lie in the same plane as an opposed surface 12c of the first core base 12.

<Annular Magnet 30>

As depicted in FIGS. 10 and 13, the annular magnet 30 is sandwiched between the first rotor core 10 and the second rotor core 20. A first surface 30a of the annular magnet 30 is held in contact with a facing surface 12b of the first core base 12 whereas a second surface 30b of the annular magnet 30 is held in contact with a facing surface 22b of the second core base 22. An outer peripheral surface 30c of the annular magnet 30 forms a circle that has a center coinciding with the central axis C and is concentric with the outer peripheral surface 12a of the first core base 12 and the outer peripheral surface 22a of the second core base 22. The annular magnet 30 is formed to have the same outside diameter as the first and second core bases 12, 22.

The annular magnet 30 is magnetized in the axial direction. Specifically, the annular magnet 30 is magnetized such that a portion of the annular magnet 30 close to the first core base 12, that is, the first surface 30a, becomes a north pole and a portion of the annular magnet 30 close to the second core base 22, that is, the second surface 30b, becomes a south pole. With the annular magnet 30 thus magnetized, the individual first claw poles 11 of the first rotor core 10 function as north poles (first magnetic poles) and the individual second claw poles 21 of the second rotor core 20 function as south poles (second magnetic poles).

<First Interpole Magnets 31 and Second Interpole Magnets 32>

First interpole magnets 31 each having the shape of a quadrangular prism elongated in the axial direction are fixedly fitted between the first side surface 11c of each first claw pole 11 and the first side surface 21c of the adjacent second claw pole 21. The individual first interpole magnets 31 are formed such that first axial ends of the first interpole magnets 31 extend beyond the opposed surface 12c of the first core base 12 by protruding length D and second axial ends of the first interpole magnets 31 extend beyond the opposed surface 22c of the second core base 22 by the same protruding length D. Also, the first interpole magnets 31 are formed such that radially outer surfaces thereof form the same curved surface as the outer peripheral surfaces 11a of the first claw poles 11 and the outer peripheral surfaces 21a of the second claw poles 21.

The individual first interpole magnets 31 are magnetized in the circumferential direction. Specifically, the first interpole magnets 31 are individually magnetized such that portions of the first interpole magnets 31 close to the first claw poles 11 functioning as the north poles equally become north poles and portions of the first interpole magnets 31 close to the second claw poles 21 functioning as the south poles equally become south poles.

Second interpole magnets 32 each having the shape of a quadrangular prism elongated in the axial direction are fixedly fitted between the second side surface 11d of each first claw pole 11 and the second side surface 21d of the adjacent second claw pole 21. Like the first interpole magnets 31, the individual second interpole magnets 32 are formed such that first axial ends of the second interpole magnets 32 extend beyond the opposed surface 12c of the first core base 12 by protruding length D and second axial ends of the second interpole magnets 32 extend beyond the opposed surface 22c of the second core base 22 by the same protruding length D. Also, the second interpole magnets 32 are formed such that radially outer surfaces thereof form the same curved surface as the outer peripheral surfaces 11a of the first claw poles 11 and the outer peripheral surfaces 21a of the second claw poles 21.

The individual second interpole magnets 32 are magnetized in the circumferential directions. Specifically, the second interpole magnets 32 are individually magnetized such that portions of the second interpole magnets 32 close to the first claw poles 11 functioning as the north poles equally become north poles and portions of the second interpole magnets 32 close to the second claw poles 21 functioning as the south poles equally become south poles.

As will be recognized from the above, the first interpole magnets 31 and the second interpole magnets 32 are magnetized such that magnetization directions of the first and second interpole magnets 31, 32 are alternately reversed in the circumferential direction.

<First Rear-Side Auxiliary Magnets 41 and Second Rear-Side Auxiliary Magnets 42>

As depicted in FIG. 11, each of first rear-side auxiliary magnets 41 is fixedly fitted in a space that is surrounded by the inner peripheral surface 21b of one of the second claw poles 21, the outer peripheral surface of the annular magnet 30, the first core base 12, one of the first interpole magnets 31 and one of the second interpole magnets 32 and opens to the side of the opposed surface 12c of the first rotor core 10.

The first rear-side auxiliary magnets 41 are magnetized in radial directions. Specifically, the first rear-side auxiliary magnets 41 are magnetized such that portions of the first rear-side auxiliary magnets 41 held in contact with the inner peripheral surfaces 21b of the second claw poles 21 equally become south poles and portions of the first rear-side auxiliary magnets 41 held in contact with the first core base 12 equally become north poles.

As depicted in FIG. 11, each of second rear-side auxiliary magnets 42 is fixedly fitted in a space that is surrounded by the inner peripheral surface 11b of one of the first claw poles 11, the outer peripheral surface of the annular magnet 30, the second core base 22, one of the first interpole magnets 31 and one of the second interpole magnets 32 and opens to the side of the opposed surface 22c of the second rotor core 20.

The second rear-side auxiliary magnets 42 are magnetized in radial directions. Specifically, the second rear-side auxiliary magnets 42 are magnetized such that portions of the second rear-side auxiliary magnets 42 held in contact with the inner peripheral surfaces 11b of the first claw poles 11 equally become north poles and portions of the second rear-side auxiliary magnets 42 held in contact with the second core base 22 equally become south poles.

Figure 12A:
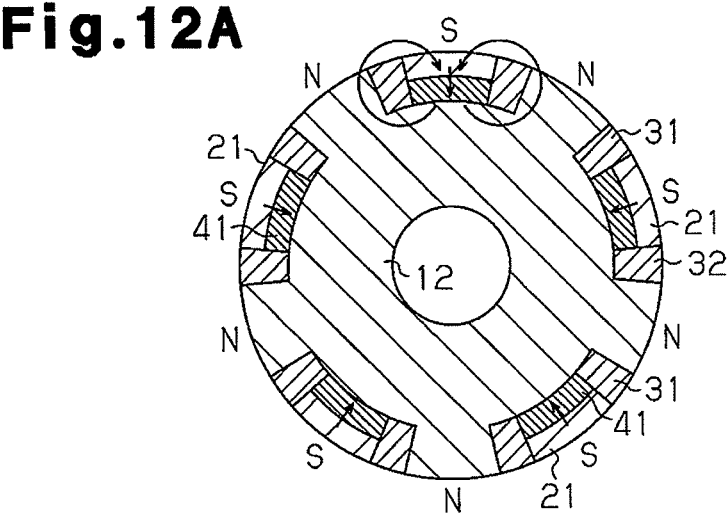
FIG. 12A is a cross-sectional view taken along lines a-a of FIG. 11.

Consequently, as depicted in FIG. 12A representing a cross section of the first core base 12 perpendicular to the axial direction, the second claw poles 21, of which portions close to the stator 5 are caused to function as the south poles by the first rear-side auxiliary magnets 41, and the first claw poles 11, which are caused to function as the salient north poles by the first rear-side auxiliary magnets 41 are alternately arranged in the circumferential direction.

Figure 12C:
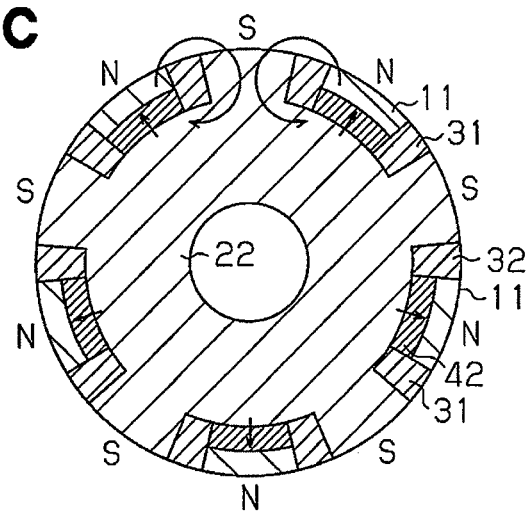
FIG. 12C is a cross-sectional view taken along lines c-c of FIG. 11.

As depicted in FIG. 12C representing a cross section of the second core base 22 perpendicular to the axial direction, the first claw poles 11, of which portions close to the stator 5 are caused to function as the north poles by the second rear-side auxiliary magnets 42, and the second claw poles 21, which are caused to function as the salient south poles by the second rear-side auxiliary magnets 42 are alternately arranged in the circumferential direction.

Also, as depicted in FIG. 12B representing a cross section of the annular magnet 30 perpendicular to the axial direction, the first claw poles 11, of which portions close to the stator 5 are caused to function as the north poles by the first rear-side auxiliary magnets 41, and the second claw poles 21, of which portions close to the stator 5 are caused to function as the south poles by the second rear-side auxiliary magnets 42, are alternately arranged in the circumferential direction, together constituting a Lundell structure.

<First Dislodgement Preventing Member 51 and Second Dislodgement Preventing Member 52>

Referring to FIG. 11, a first dislodgement preventing member 51 serving as a fixing member is formed on the opposed surface 12c of the first core base 12, from which the first and second interpole magnets 31, 32 protrude within the first rotor core 10. The first dislodgement preventing member 51, which is formed by molding of plastic the entirety of the opposed surface 12c of the first core base 12 including protruding portions of the first and second interpole magnets 31, 32, firmly fix the first rear-side auxiliary magnets 41 and the first and second interpole magnets 31, 32 in the axial and radial directions.

A second dislodgement preventing member 52 serving as another fixing member is formed on the opposed surface 22c of the second core base 22, from which the first and second interpole magnets 31, 32 protrude within the second rotor core 20. The second dislodgement preventing member 52, which is formed by molding of plastic the entirety of the opposed surface 22c of the second core base 22 including protruding portions of the first and second interpole magnets 31, 32, firmly fix the second rear-side auxiliary magnets 42 and the first and second interpole magnets 31, 32 in the axial and radial directions.

The first and second dislodgement preventing members 51, 52 allow the first and second interpole magnets 31, 32 and the first and second rear-side auxiliary magnets 41, 42 to be securely fixed in both the axial and radial directions. Consequently, the first and second interpole magnets 31, 32 and the first and second rear-side auxiliary magnets 41, 42 are kept from escaping in the axial and radial directions due to a centrifugal force that occurs when the rotor 7 rotates.

The operation of the second embodiment is described below.

The first and second dislodgement preventing members 51, 52 are formed on the opposed surface 12c of the first core base 12, from which the first and second interpole magnets 31, 32 protrude, and on the opposed surface 22c of the second core base 22, from which the first and second interpole magnets 31, 32 protrude.

The first and second dislodgement preventing members 51, 52 firmly fix the first and second interpole magnets 31, 32 and the first and second rear-side auxiliary magnets 41, 42 in both the axial and radial directions. With this arrangement, the first and second interpole magnets 31, 32 and the first and second rear-side auxiliary magnets 41, 42 are kept from escaping in the axial and radial directions due to the centrifugal force that occurs when the rotor 7 rotates.

The first dislodgement preventing member 51 is formed only on the opposed surface 12c of the first core base 12, and the second dislodgement preventing member 52 is formed only on the opposed surface 22c of the second core base 22, so that an air gap formed between the stator 5 and the rotor 7 is reduced in radial dimension (thickness).

Described below are advantages of the second embodiment.

(11) According to the present embodiment, the first and second interpole magnets 31, 32 are firmly fixed in position in both the axial and radial directions without being exposed with the aid of the first and second dislodgement preventing members 51, 52. As a result, the first and second interpole magnets 31, 32 are kept from escaping in the axial and radial directions due to the centrifugal force, which occurs when the rotor 7 rotates.

(12) According to the present embodiment, the first dislodgement preventing member 51 is formed only on the opposed surface 12c of the first core base 12 and the second dislodgement preventing member 52 is formed only on the opposed surface 22c of the second core base 22. Thus, the air gap formed between the stator 5 and the rotor 7 is reduced in thickness thereby improving motor output.

Third Embodiment

A third embodiment of the present disclosure will now be described with reference to FIGS. 14 to 17.

This embodiment is characterized by a dislodgement preventing structure provided in a rotor 7 to keep first and second interpole magnets 31, 32 and first and second rear-side auxiliary magnets 41, 42 in position. The third embodiment has otherwise the same configuration as the foregoing second embodiment. For purposes of illustration, the following discussion includes a detailed description of characteristic features of the embodiment only, in which same reference symbols designate corresponding elements.

As depicted in FIGS. 14 to 17, a first fixing plate 61 for preventing escape is securely fixed to the opposed surface 12c of the first core base 12 and a second fixing plate 62 for preventing escape is securely fixed to the opposed surface 22c of the second core base 22. The first and second fixing plates 61, 62 of this embodiment are made of a nonmagnetic material.

Figure 15:
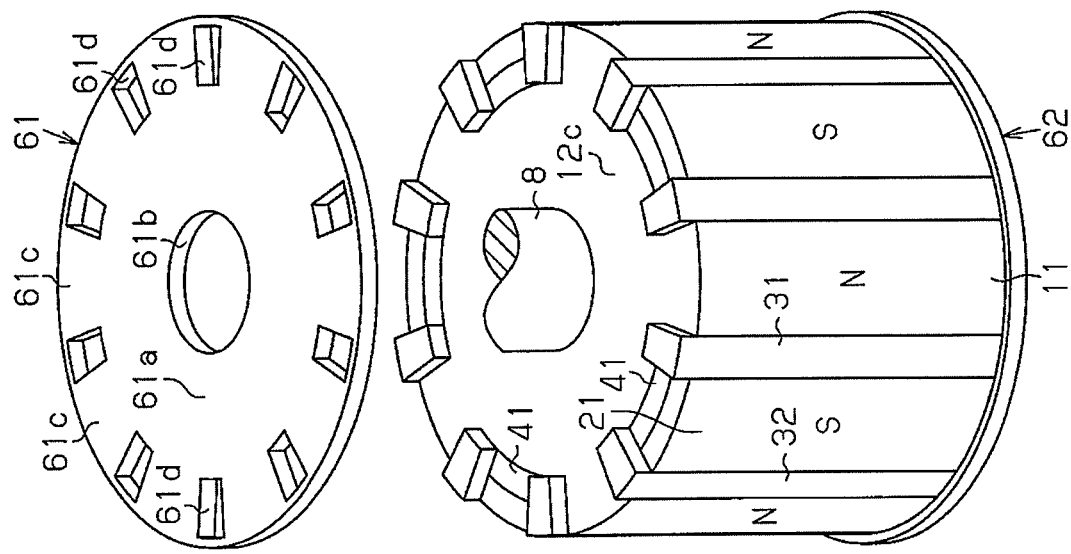
FIG. 15 is a perspective view representing, in particular, a first fixing plate of the rotor of FIG. 14.
Figure 14:
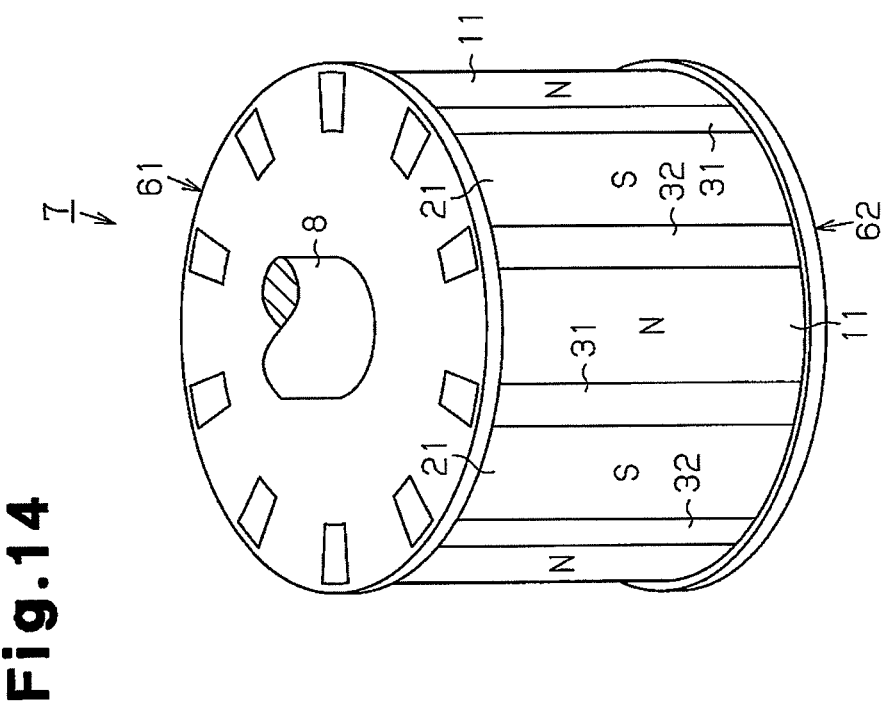
FIG. 14 is a perspective view of a rotor according to a third embodiment as viewed from the side of a first rotor core thereof.
Figure 17:
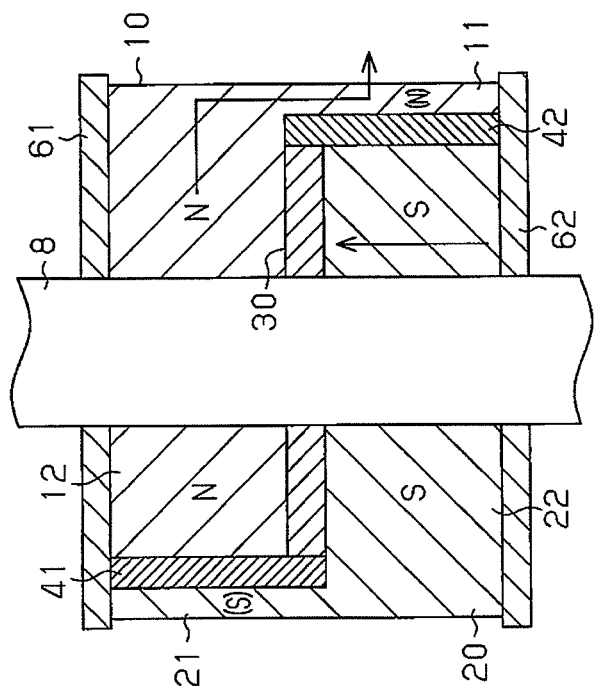
FIG. 17 is a cross-sectional view of the rotor of FIG. 14 in the axial direction thereof.

As depicted in FIG. 15, the first fixing plate 61 includes a disk 61a. The first fixing plate 61 is so structured as to have a thickness that is equal to protruding length D of the first and second interpole magnets 31, 32 from the opposed surface 12c of the first core base 12. The first fixing plate 61 has a through hole 61b formed in a central part thereof through which the rotary shaft 8 is passed.

The first fixing plate 61 has ten engagement holes 61d formed therethrough at equal angular intervals in an outer peripheral part of the disk 61a. Portions of the disk 61a between one engagement hole 61d and another serve as supporting plate portions 61c. The first and second interpole magnets 31, 32 protruding from the opposed surface 12c of the first core base 12 are fixedly fitted in the individual engagement holes 61d.

Figure 16:
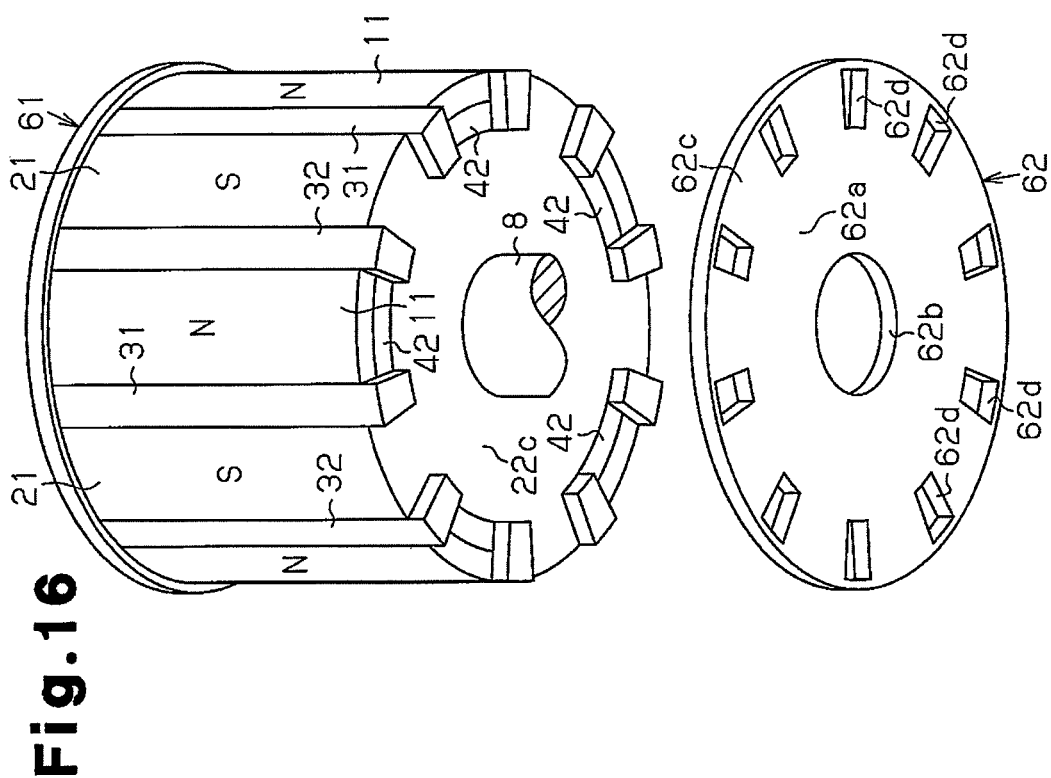
FIG. 16 is a perspective view representing, in particular, a second fixing plate of the rotor of FIG. 14.

As depicted in FIG. 16, the second fixing plate 62 includes a disk 62a. The second fixing plate 62 is so structured as to have a thickness that is equal to protruding length D of the first and second interpole magnets 31, 32 from the opposed surface 22c of the second core base 22. The second fixing plate 62 has a through hole 62b formed in a central part thereof through which the rotary shaft 8 is passed.

The second fixing plate 62 has ten engagement holes 62d formed therethrough at equal angular intervals in an outer peripheral part of the disk 62a. Portions of the disk 62a between one engagement hole 62d and another serve as supporting plate portions 62c. The first and second interpole magnets 31, 32 protruding from the opposed surface 22c of the second core base 22 are fixedly fitted in the individual engagement holes 62d.

The operation of the third embodiment is described below.

The first fixing plate 61 is formed on the opposed surface 12c of the first core base 12, from which the first and second interpole magnets 31, 32 protrude in one direction, while the second fixing plate 62 is formed on the opposed surface 22c of the second core base 22, from which the first and second interpole magnets 31, 32 protrude in the opposite direction.

The first fixing plate 61 firmly fixes the first rear-side auxiliary magnets 41 and the first interpole magnets 31 in both the axial and radial directions while the second fixing plate 62 firmly fixes the second rear-side auxiliary magnets 42 and the second interpole magnets 32 in both the axial and radial directions. This arrangement serves to keep the first and second interpole magnets 31, 32 and the first and second rear-side auxiliary magnets 41, 42 from escaping in the axial and radial directions due to a centrifugal force that occurs when the rotor 7 rotates.

The first fixing plate 61 is formed only on the opposed surface 12c of the first core base 12 and the second fixing plate 62 is formed only on the opposed surface 22c of the second core base 22, so that an air gap formed between the stator 5 and the rotor 7 can be reduced in radial dimension (thickness).

The first and second fixing plates 61, 62 are made of a nonmagnetic material. Magnetic flux that extends from the annular magnet 30 sandwiched between the first rotor core 10 and the second rotor core 20 is passed through the first core base 12 and guided to the individual first claw poles 11 by the first fixing plate 61 as indicated by an arrow in FIG. 17. On the other hand, magnetic flux that emerges from each of the first claw poles 11 is passed through the second core base 22 and guided to the annular magnet 30 by the second fixing plate 62.

This means that the magnetic flux does not leak in the axial direction from either the opposed surface 12c of the first core base 12 or the opposed surface 22c of the second core base 22.

The foregoing third embodiment has the below-described advantages in addition to advantages (11) and (12) of the earlier-described second embodiment.

(21) According to the present embodiment, the first and second fixing plates 61, 62 are made of a nonmagnetic material, so that the magnetic flux does not leak in the axial direction. Also, neither the first interpole magnets 31 nor the second interpole magnets 32 will come off the rotor 7 as a result of rotation thereof.

(22) The first and second fixing plates 61, 62 of the present embodiment are a one-piece member formed separately from the first rotor core 10 and the second rotor core 20. This makes it possible to achieve a cost reduction with a small number of components. In addition, this embodiment facilitates component management as the first and second fixing plates 61, 62 are formed in the same shape.

Fourth Embodiment

A fourth embodiment of the present disclosure will now be described with reference to FIGS. 18 to 21.

This embodiment is characterized by a dislodgement preventing structure provided in a rotor 7 to keep first and second interpole magnets 31, 32 and first and second rear-side auxiliary magnets 41, 42 in position. The fourth embodiment has otherwise the same configuration as the foregoing second embodiment. Thus, for purposes of illustration, the following discussion includes a detailed description of characteristic features of the embodiment only, in which same reference symbols designate corresponding elements.

As depicted in FIGS. 18 to 21, a first fixing plate 71 for preventing escape is securely fixed to the opposed surface 12c of the first core base 12 and a second fixing plate 72 for preventing escape is securely fixed to the opposed surface 22c of the second core base 22. The first and second fixing plates 71, 72 of this embodiment are made of a magnetic material.

Figure 19:
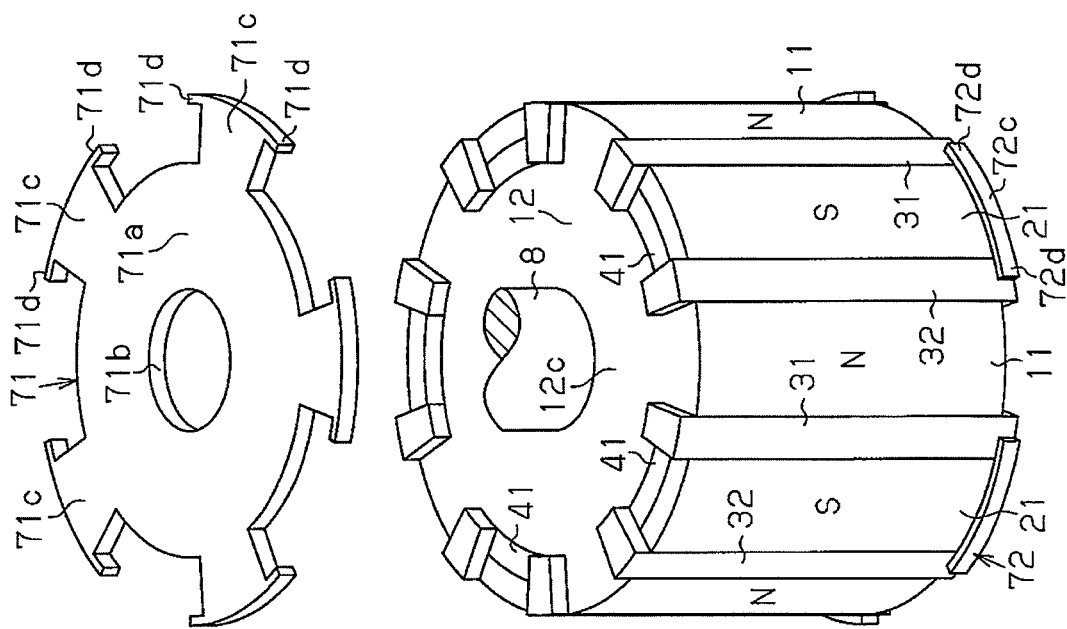
FIG. 19 is a perspective view representing, in particular, a first fixing plate of the rotor of FIG. 18.
Figure 18:
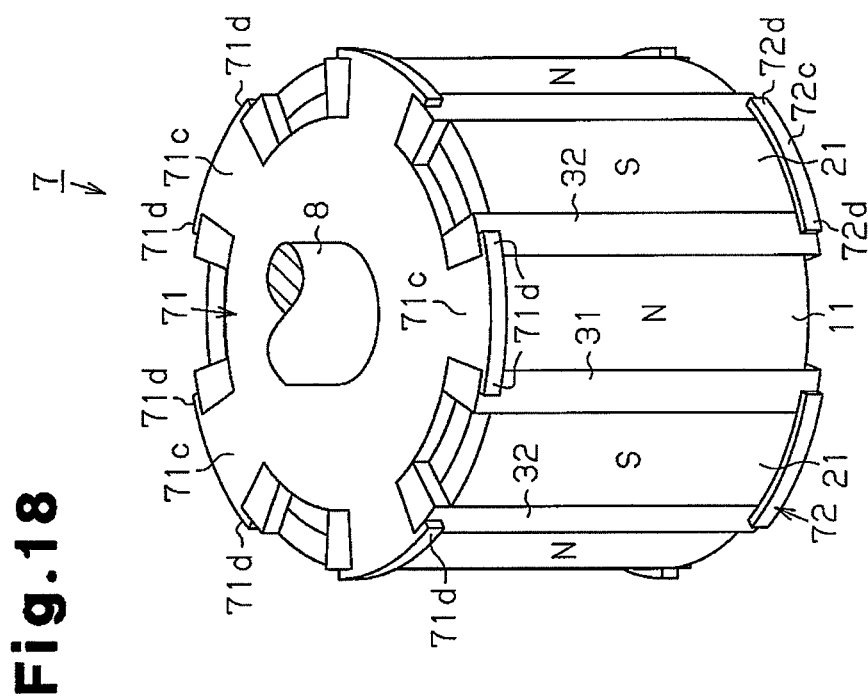
FIG. 18 is a perspective view of a rotor according to a fourth embodiment as viewed from the side of a first rotor core thereof.

As depicted in FIG. 19, the first fixing plate 71 includes a disk 71a. The first fixing plate 71 is so structured as to have a thickness that is equal to protruding length D of the first and second interpole magnets 31, 32 from the opposed surface 12c of the first core base 12. The first fixing plate 71 has a through hole 71b formed in a central part thereof, through which the rotary shaft 8 is passed.

As depicted also in FIG. 19, the first fixing plate 71 has five supporting plate portions 71c, which extend radially outward from an outer peripheral surface of the disk 71a at equal angular intervals. The individual supporting plate portions 71c are formed such that outer ends thereof extend radially outward beyond outer peripheral surfaces of the first claw poles 11 formed on the first rotor core 10.

Each of the supporting plate portions 71c has a width equal to that of each of the first arms 13 formed on the first rotor core 10 (refer to FIG. 13) as measured in the circumferential direction. At an outer end of each of the supporting plate portions 71c, there are formed a pair of arcuate hook-on plate portions 71d extending in the circumferential direction.

The first fixing plate 71 is securely fixed to the first rotor core 10 such that the disk 71a and the five supporting plate portions 71c together cover the opposed surface 12c of the first core base 12 while exposing the first and second interpole magnets 31, 32 from between the supporting plate portions 71c. The individual hook-on plate portions 71d arranged substantially in a ring-like form retain portions of the first and second interpole magnets 31, 32 protruding from the opposed surface 12c of the first core base 12 that are located on both sides of each first claw pole 11 radially inward.

Figure 20:
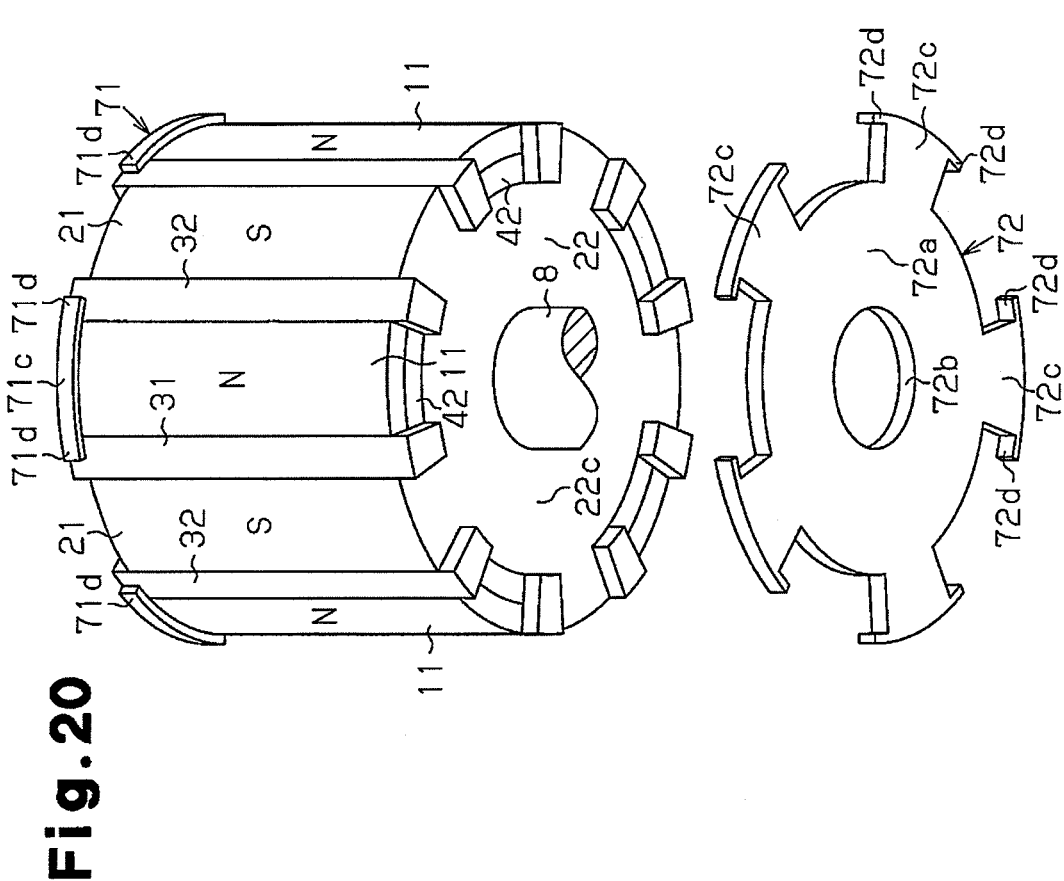
FIG. 20 is a perspective view representing, in particular, a second fixing plate of the rotor of FIG. 18.

As depicted in FIG. 20, the second fixing plate 72 includes a disk 72a. The second fixing plate 72 is so structured as to have a thickness that is equal to the protruding length D of the first and second interpole magnets 31, 32 from the opposed surface 22c of the second core base 22. The second fixing plate 72 has a through hole 72b formed in a central part thereof through which the rotary shaft 8 is passed.

As depicted also in FIG. 20, the second fixing plate 72 has five supporting plate portions 72c, which extend radially outward from an outer peripheral surface of the disk 72a at equal angular intervals. The individual supporting plate portions 72c are formed such that outer ends thereof extend radially outward beyond outer peripheral surfaces of the second claw poles 21 formed on the second rotor core 20.

Each of the supporting plate portions 72c has a width equal to that of each of the second arms 23 formed on the second rotor core 20 as measured in the circumferential direction. At an outer end of each of the supporting plate portions 72c, there are formed a pair of arcuate hook-on plate portions 72d extending in the circumferential direction.

The second fixing plate 72 is securely fixed to the second rotor core 20 such that the disk 72a and the five supporting plate portions 72c together cover the opposed surface 22c of the first and second interpole magnets 31, 32 from between the supporting plate portions 72c. The individual hook-on plate portions 72d arranged substantially in a ring-like form retain portions of the first and second interpole magnets 31, 32 axially protruding from the opposed surface 22c of the second core base 22 that are located on both sides of each second claw pole 21 radially inward.

The operation of the fourth embodiment is described below.

The first fixing plate 71 is formed on the opposed surface 12c of the first core base 12, from which the first and second interpole magnets 31, 32 protrude in one direction, while the second fixing plate 72 is formed on the opposed surface 22c of the second core base 22, from which the first and second interpole magnets 31, 32 protrude in the opposite direction.

A plurality of supporting plate portions 71c of the first fixing plate 71 fixedly retain the first and second interpole magnets 31, 32 and the first and second rear-side auxiliary magnets 41, 42 in the circumferential direction while the hook-on plate portions 71d of the first fixing plate 71 retain the portions of the first and second interpole magnets 31, 32 axially protruding from the opposed surface 12c of the first core base 12 in radial directions.

A plurality of supporting plate portions 72c of the second fixing plate 72 fixedly retain the first and second interpole magnets 31, 32 and the first and second rear-side auxiliary magnets 41, 42 in the circumferential direction while the hook-on plate portions 72d of the second fixing plate 72 retain the portions of the first and second interpole magnets 31, 32 axially protruding from the opposed surface 22c of the second core base 22 in the radial directions.

This arrangement serves to keep the first and second interpole magnets 31, 32 and the first and second rear-side auxiliary magnets 41, 42 from escaping in the axial and radial directions due to a centrifugal force that occurs when the rotor 7 rotates.

Figure 21:
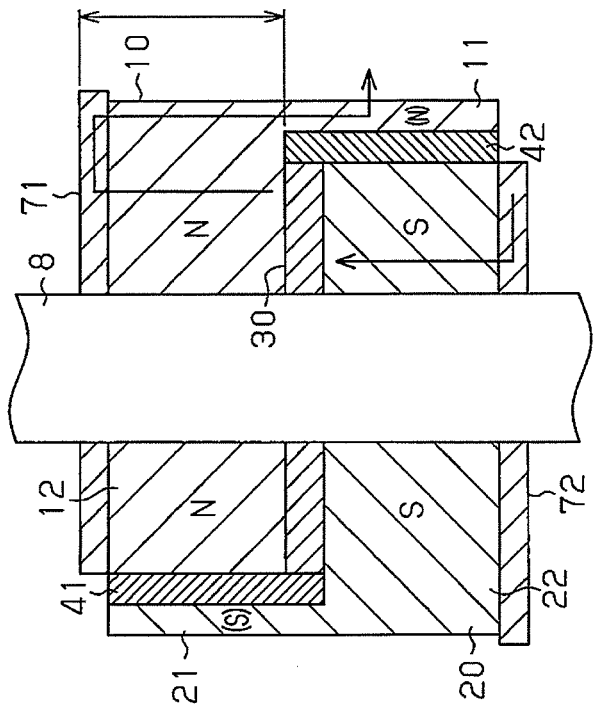
FIG. 21 is a cross-sectional view of the rotor of FIG. 18 in the axial direction thereof.

Since the first and second fixing plates 71, 72 are made of a magnetic material, magnetic flux can be passed through the first and second fixing plates 71, 72 as indicated by arrows in FIG. 21. It is therefore possible to enlarge magnetic paths through the first core base 12 of the first rotor core 10 by as much as the thickness of the first and second fixing plates 71, 72. This makes it possible to enlarge a magnetic circuit.

The foregoing fourth embodiment has the below-described advantages in addition to the advantages of the earlier-described second and third embodiments.

(31) According to the present embodiment, the first and second fixing plates 71, 72 are made of a magnetic material, so that it is possible to improve motor output by enlarging the magnetic circuit and reducing reluctance.

(32) According also to the present embodiment, the first and second fixing plates 71, 72 are made of a magnetic material, so that the first and second fixing plates 71, 72 can function as part of the first and second rotor cores 10, 20. It is therefore possible to adjust the length of the rotor 7 in the axial direction.

Figure 22:
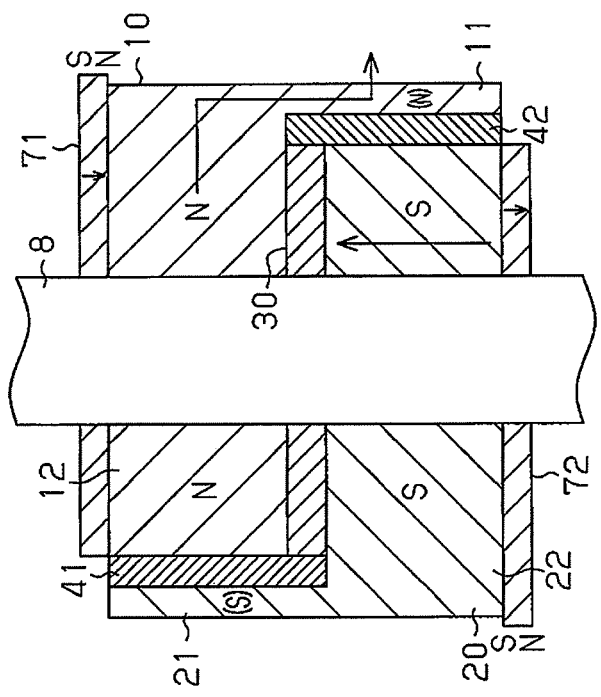
FIG. 22 is an explanatory cross-sectional view of first and second fixing plates in one modification of the fourth embodiment.

As stated above, the first and second fixing plates 71, 72 are made of a magnetic material in the fourth embodiment. This configuration may be so modified as to form the first and second fixing plates 71, 72 with permanent magnets in order to prevent leakage of magnetic flux. In this case, a portion of the first fixing plate 71 close to the first core base 12 must be made to act as a north pole and a portion of the first fixing plate 71 far away from the first core base 12 must be made to act as a south pole as depicted in FIG. 22. Likewise, a portion of the second fixing plate 72 close to the second core base 22 must be made to act as a south pole and a portion of the second fixing plate 72 far away from the second core base 22 must be made to act as a north pole.

The above-described structure of the fourth embodiment serves to prevent the first and second interpole magnets 31, 32 and the first and second rear-side auxiliary magnets 41, 42 from being dislodged. The structure also prevents leakage of magnetic flux in the axial direction.

Fifth Embodiment

A fifth embodiment of the present disclosure will now be described hereunder.

The fifth embodiment is characterized in that a rotor 80 has a tandem structure configured by stacking a plurality (two, for example) of rotors 7 each including a first rotor core 10 and a second rotor core 20. Thus, for purposes of illustration, the following discussion includes a detailed description of characteristic features of the embodiment only, in which same reference symbols designate corresponding elements.

Figure 23:
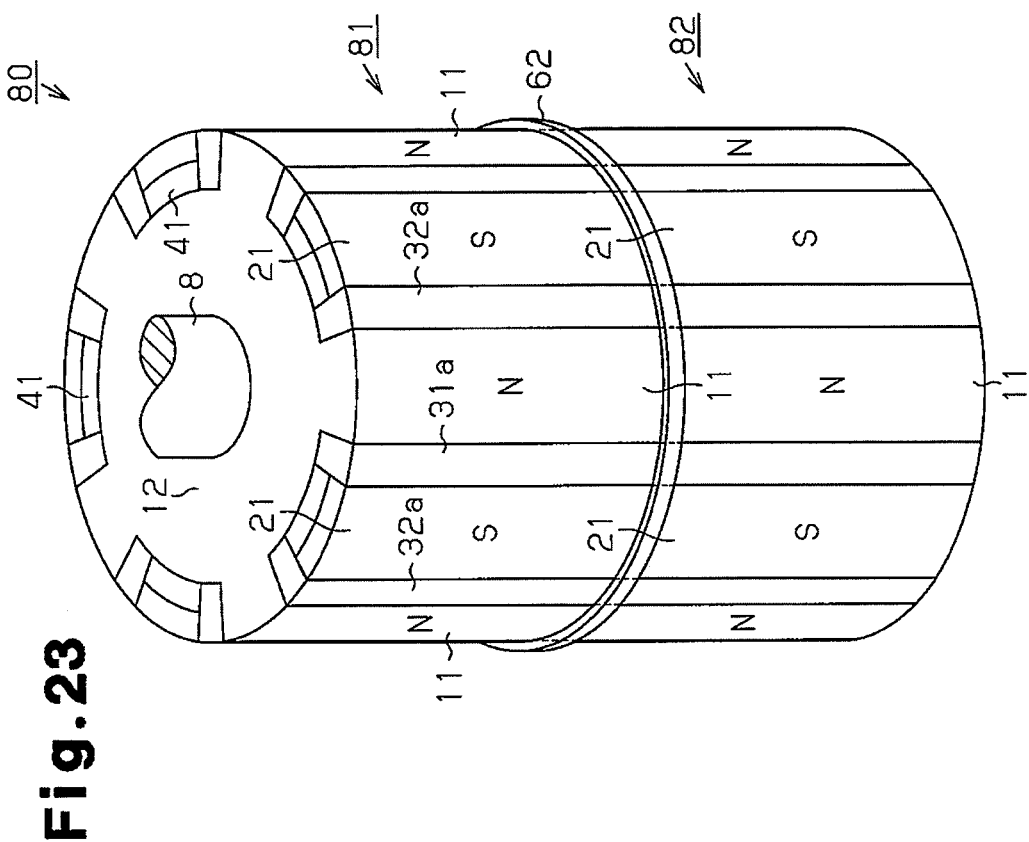
FIG. 23 is a perspective view of a rotor having a tandem structure according to a fifth embodiment.

As illustrated in FIG. 23, the rotor 80 of this embodiment is configured by stacking and fixing an upper rotor 81 on top of a lower rotor 82 in an axial direction. The upper and lower rotors 81, 82 share common first interpole magnets 31a and second interpole magnets 32a. The first interpole magnets 31a and the second interpole magnets 32a have lengths that are substantially twice as large as those of the first interpole magnets 31 and the second interpole magnets 32 of the second embodiment, respectively.

Like the rotor 7 described in the second embodiment, the upper rotor 81 includes the first rotor core 10, the second rotor core 20, an annular magnet 30, the first interpole magnets 31a, the second interpole magnets 32a, first rear-side auxiliary magnets 41 and second rear-side auxiliary magnets 42. In the upper rotor 81 depicted in FIG. 23, the first rotor core 10 is located on an upper side and the second rotor core 20 is located on a lower side.

The upper rotor 81 is configured such that the first interpole magnets 31a and the second interpole magnets 32a, which are located alternately on both sides of first claw poles 11 in the circumferential direction, are not formed to protrude beyond an opposed surface 12c of a first core base 12. First axial end surfaces of the first claw poles 11 and second claw poles 21, or upper end surfaces thereof as illustrated in FIG. 23, are flush with the opposed surface 12c of the first core base 12 of the upper rotor 81, and second axial end surfaces of the first claw poles 11 and the second claw poles 21, or lower end surfaces thereof as illustrated in FIG. 23, are flush with an opposed surface 22c of a second core base 22.

Like the rotor 7 described in the second embodiment, the lower rotor 82 includes the first rotor core 10, the second rotor core 20, the annular magnet 30, the first interpole magnets 31a, the second interpole magnets 32a, first rear-side auxiliary magnets 41 and second rear-side auxiliary magnets 42. In the lower rotor 82 depicted in FIG. 23, the second rotor core 20 is located on an upper side and the first rotor core 10 is located on a lower side.

The lower rotor 82 is configured such that the first interpole magnets 31a and the second interpole magnets 32a, which are located alternately on both sides of first claw poles 11 in the circumferential direction, are not formed to protrude beyond an opposed surface 22c of a second core base 22. First axial end surfaces of the first claw poles 11 and second claw poles 21, or upper end surfaces thereof as illustrated in FIG. 23, are flush with the opposed surface 22c of the second core base 22 of the lower rotor 82, and second axial end surfaces of the first claw poles 11 and the second claw poles 21, or lower surfaces thereof as illustrated in FIG. 23, are flush with an opposed surface 12c of a first core base 12 of the lower rotor 82.

The upper rotor 81 and the lower rotor 82 are arranged with a predetermined distance provided therebetween. Specifically, in the present embodiment, this distance equals the thickness of the second fixing plate 62 of the third embodiment made of a nonmagnetic material. The thickness of the second fixing plate 62 equals the protruding length D of the first and second interpole magnets 31, 32. The present embodiment also includes a second fixing plate 62 made of a nonmagnetic material located between the upper rotor 81 and the lower rotor 82, the second fixing plate 62 being structured in the same fashion as in the third embodiment illustrated in FIG. 16.

The second fixing plate 62 has a plurality of engagement holes 62d formed therethrough. Portions of the first interpole magnets 31a and the second interpole magnets 32a, or exposed portions thereof, protruding into a space between the upper rotor 81 and the lower rotor 82 are fitted into the respective engagement holes 62d formed in the second fixing plate 62. The second fixing plate 62 is securely fixed to the opposed surface 22c of the second core base 22 of each of the upper rotor 81 and the lower rotor 82.

That is, the single tandem-structured rotor 80 is produced by fixedly joining the upper rotor 81 and the lower rotor 82 with the second fixing plate 62 placed in between.

The following is a description of the operation of the fifth embodiment.

The upper rotor 81 and the lower rotor 82 are stacked, sharing the common first interpole magnets 31a and second interpole magnets 32a. As a result, the upper rotor 81 and the lower rotor 82 configure the single rotor 80 having the tandem structure with the second fixing plate 62 placed in between.

Also, the first interpole magnets 31a and the second interpole magnets 32a are firmly fixed in both the axial and radial directions with the aid of the engagement holes 62d formed in the second fixing plate 62, which is located between the upper rotor 81 and the lower rotor 82. With this arrangement, the first and second interpole magnets 31a, 32a are kept from escaping in the axial and radial directions due to centrifugal force that occurs when the rotor 7 rotates.

The above-described fifth embodiment provides the following advantages.

(41) According to the present embodiment, the tandem-structured rotor 80 is produced by joining the upper rotor 81 and the lower rotor 82 with the second fixing plate 62 placed in between. Thus, compared to a structure in which the upper rotor 81 and the lower rotor 82 are directly stacked and fixed by a pair of fixing means from both the upper and lower sides to produce a rotor having a tandem structure, the present embodiment makes it possible to reduce the number of components.

(42) According also to the present embodiment, the first interpole magnets 31a and the second interpole magnets 32a shared by the upper rotor 81 and the lower rotor 82 are firmly fixed in both the axial and radial directions with the aid of the engagement holes 62d formed in the second fixing plate 62. Consequently, the first interpole magnets 31a and the second interpole magnets 32a shared by the upper rotor 81 and the lower rotor 82 are kept from escaping in the axial and radial directions due to the centrifugal force that occurs when the rotor 80 rotates.

Figure 24:
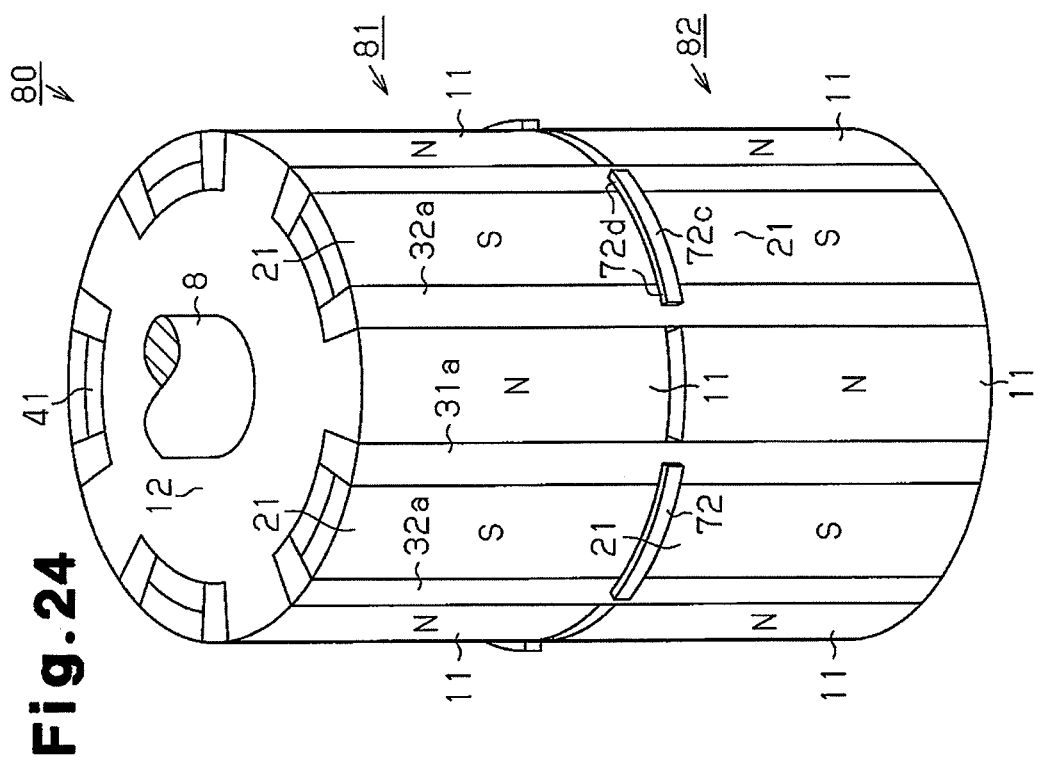
FIG. 24 is a perspective view of a rotor in one modification of the fifth embodiment.

The second fixing plate 62 is located between the upper rotor 81 and the lower rotor 82 in the above-described fifth embodiment. The embodiment may however be modified such that a second fixing plate 72 like the one illustrated in FIG. 20 that is made of a nonmagnetic material as described in the foregoing fourth embodiment is placed between the upper rotor 81 and the lower rotor 82 instead of the second fixing plate 62 as depicted in FIG. 24. The second fixing plate 72 may be made of permanent magnets although a nonmagnetic material or a magnetic material is preferable.

Sixth Embodiment

A sixth embodiment of the present disclosure will now be described hereunder.

This embodiment is characterized by the lengths of the first interpole magnets 31a and the second interpole magnets 32a provided in the tandem-structured rotor 80 of the fifth embodiment and a dislodgement preventing structure for preventing escape of the first interpole magnets 31a and the second interpole magnets 32a provided due to the increased lengths thereof. For purposes of illustration, the following discussion includes a detailed description of characteristic features of the embodiment only, in which same reference symbols designate corresponding elements.

Figure 25:
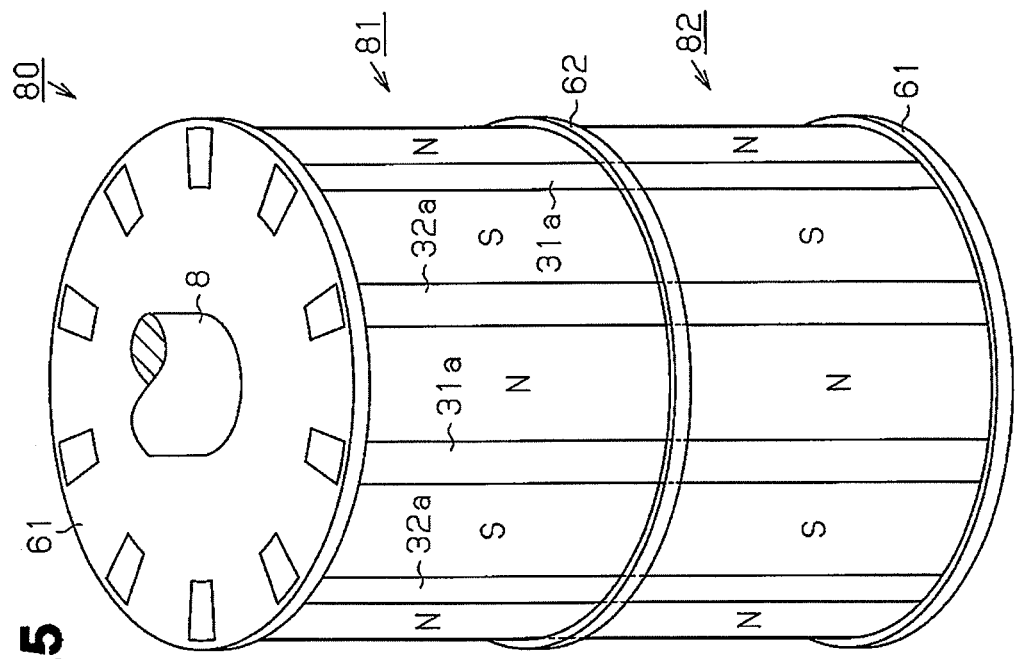
FIG. 25 is a perspective view of a rotor according to a sixth embodiment.

As illustrated in FIG. 25, an upper rotor 81 and a lower rotor 82 share common first interpole magnets 31a and second interpole magnets 32a like the upper rotor 81 and the lower rotor 82 described in the fifth embodiment. In the upper rotor 81, a first rotor core 10 is located on an upper side and a second rotor core 20 is located on a lower side. In the lower rotor 82, a second rotor core 20 is located on the upper side and a first rotor core 10 is located on the lower side. The present embodiment also includes a second fixing plate 62 located between the upper rotor 81 and the lower rotor 82 as in the foregoing fifth embodiment.

Unlike the case of the foregoing fifth embodiment, end portions of the first interpole magnets 31a and the second interpole magnets 32a that pass through the upper rotor 81 individually protrude beyond an opposed surface 12c of a first core base 12 of the upper rotor 81. That is, the end portions passing through the upper rotor 81 protrude beyond the opposed surface 12c by the same protruding length D as in the second embodiment. A first fixing plate 61, which is the same as that described in the third embodiment, is firmly fixed to the opposed surface 12c of the first core base 12 of the upper rotor 81.

Also, unlike the case of the foregoing fifth embodiment, end portions of the first interpole magnets 31a and the second interpole magnets 32a that pass through the lower rotor 82 individually protrude beyond an opposed surface 12c of a first core base 12 of the lower rotor 82. That is, the end portions passing through the lower rotor 82 protrude beyond the opposed surface 12c by the same protruding length D as in the second embodiment. Another first fixing plate 61 that is the same as that described in the third embodiment is firmly fixed to the opposed surface 12c of the first core base 12 of the lower rotor 82.

The following is a description of the operation of the sixth embodiment.

The end portions of the first interpole magnets 31a and the second interpole magnets 32a that protrude beyond the opposed surface 12c of the first core base 12 of the upper rotor 81 are retained in position by firmly fixing the first fixing plate 61 to the opposed surface 12c of the first core base 12 of the upper rotor 81.

Likewise, the end portions of the first interpole magnets 31a and the second interpole magnets 32a that protrude beyond the opposed surface 12c of the first core base 12 of the lower rotor 82 are retained in position by firmly fixing the other first fixing plate 61 to the opposed surface 12c of the first core base 12 of the lower rotor 82.

The above-described structure of the sixth embodiment serves to keep the first and second interpole magnets 31a, 32a from escaping in the axial and radial directions.

Described below are advantages of the sixth embodiment.

(51) According to the present embodiment, the first fixing plate 61 is firmly fixed to the opposed surface 12c of the first core base 12 of each of the upper and lower rotors 81, 82. Thus, the first interpole magnets 31a and the second interpole magnets 32a shared by the upper rotor 81 and the lower rotor 82 are more securely fixed in position in both the axial and radial directions. Consequently, the first interpole magnets 31a and the second interpole magnets 32a are kept from escaping in the radial directions due to a centrifugal force that occurs when the tandem-structured rotor 80 rotates.

Figure 26:
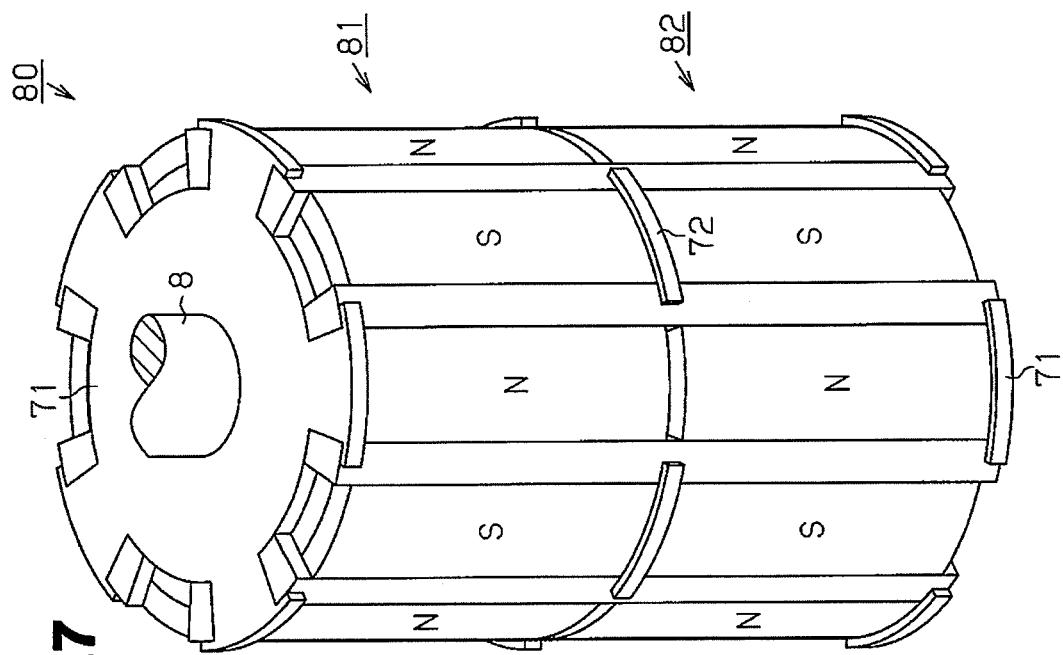
FIG. 26 is a perspective view of a rotor in one modification of the sixth embodiment.

In the above-described sixth embodiment, a pair of first fixing plates 61 each structured as in the foregoing third embodiment are firmly fixed to the opposed surfaces 12c of the first core bases 12 of the upper and lower rotors 81, 82. The embodiment may however be modified such that a pair of first fixing plates 71 made of a nonmagnetic material like the one described in the foregoing fourth embodiment are firmly fixed to the opposed surfaces 12c of the first core bases 12 of the upper and lower rotors 81, 82 instead of the first fixing plates 61 as depicted in FIG. 26.

Seventh Embodiment

A seventh embodiment of the present disclosure will now be described hereunder.

This embodiment employs a dislodgement preventing structure for preventing escape of first interpole magnets 31a and second interpole magnets 32a that is different from the dislodgement preventing structure employed in the tandem-structured rotor 80 described in the foregoing sixth embodiment. For purposes of illustration, the following discussion includes a detailed description of differing portions only, in which same reference symbols designate corresponding elements.

Figure 27:
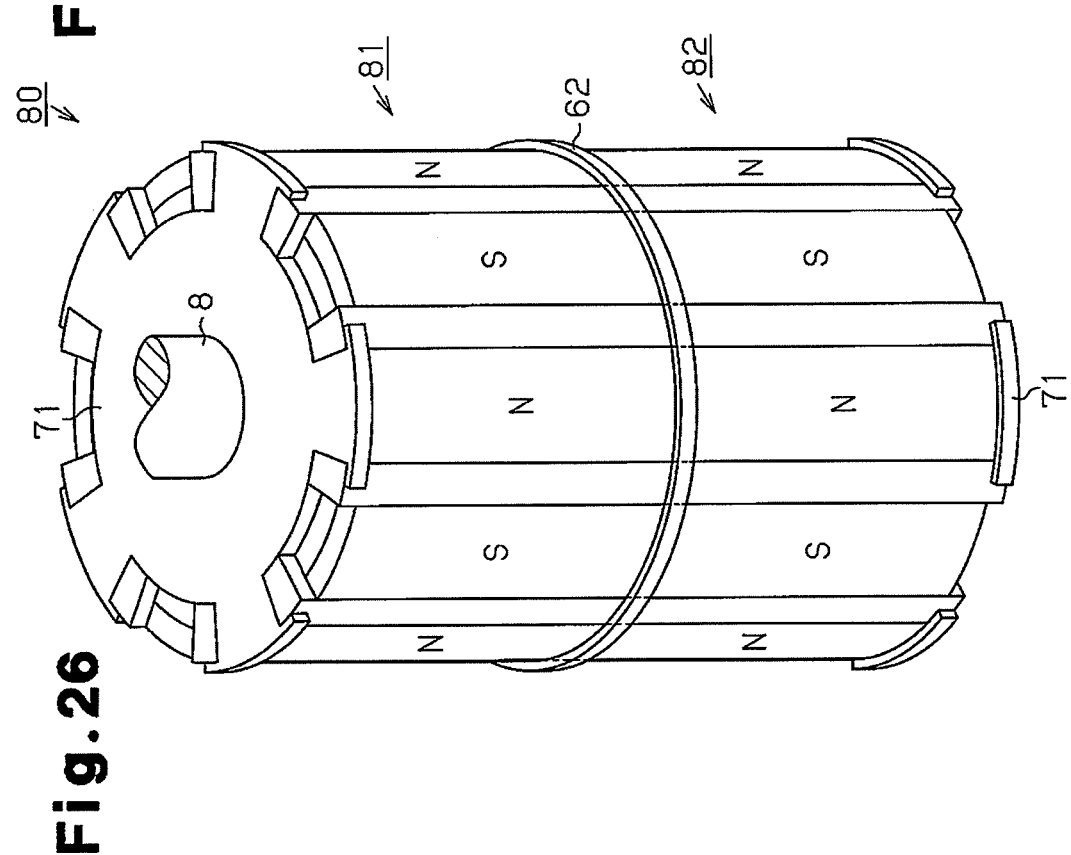
FIG. 27 is a perspective view of a rotor according to a seventh embodiment.

As depicted in FIG. 27, a rotor 80 of the present embodiment includes a second fixing plate 72 made of a nonmagnetic material like the one described in the foregoing fourth embodiment illustrated in FIG. 20. The second fixing plate 72 is placed between an upper rotor 81 and a lower rotor 82. Also, first fixing plates 71 like the one described in the foregoing fourth embodiment are firmly fixed individually to opposed surfaces 12c of first core bases 12 of the upper and lower rotors 81, 82.

The following is a description of the operation of the seventh embodiment.

End portions of the first interpole magnets 31a and the second interpole magnets 32a that protrude beyond the opposed surface 12c of the first core base 12 of the upper rotor 81 are retained in position by firmly fixing the first fixing plate 71 to the opposed surface 12c of the first core base 12 of the upper rotor 81.

Likewise, end portions of the first interpole magnets 31a and the second interpole magnets 32a that protrude beyond the opposed surface 12c of the first core base 12 of the lower rotor 82 are retained in position by firmly fixing the other first fixing plate 71 to the opposed surface 12c of the first core base 12 of the lower rotor 82.

The above-described structure of the seventh embodiment serves to keep the first and second interpole magnets 31a, 32a from escaping in the axial and radial directions.

Described below are advantages of the seventh embodiment.

(61) According to the present embodiment, the first fixing plate 71 is firmly fixed to the opposed surface 12c of the first core base 12 of each of the upper and lower rotors 81, 82. Thus, the first interpole magnets 31a and the second interpole magnets 32a shared by the upper rotor 81 and the lower rotor 82 are more securely fixed in position in both the axial and radial directions. Consequently, the first interpole magnets 31a and the second interpole magnets 32a are kept from escaping in the radial directions due to a centrifugal force that occurs when the tandem-structured rotor 80 rotates.

Figure 28:
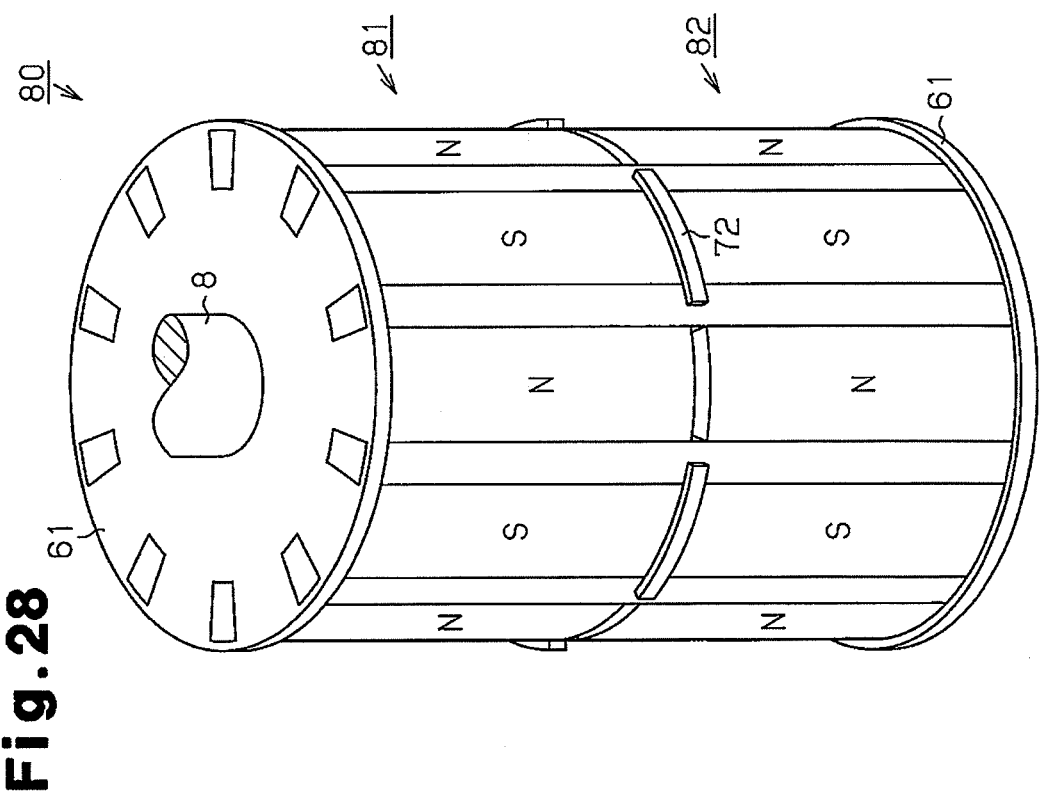
FIG. 28 is a perspective view of a rotor in one modification of the seventh embodiment.

In the seventh embodiment, the first fixing plate 71 is provided on each of the opposed surfaces 12c, 22c of the first and second core bases 12, 22 of the upper rotor 81. The embodiment may however be modified such that first fixing plates 61 made of a nonmagnetic material like the one described in the foregoing third embodiment are firmly fixed to both the opposed surfaces 12c, 22c, instead of the first fixing plates 71 as depicted in FIG. 28.

The individual embodiments thus far discussed may be modified and implemented in the below-described manner.

Although the fixing members (fixing plates) are provided on both axial end surfaces of the rotor 7 in the foregoing second to fourth embodiments, the fixing member may be provided on only one axial end surface of the rotor 7.

Figure 29:
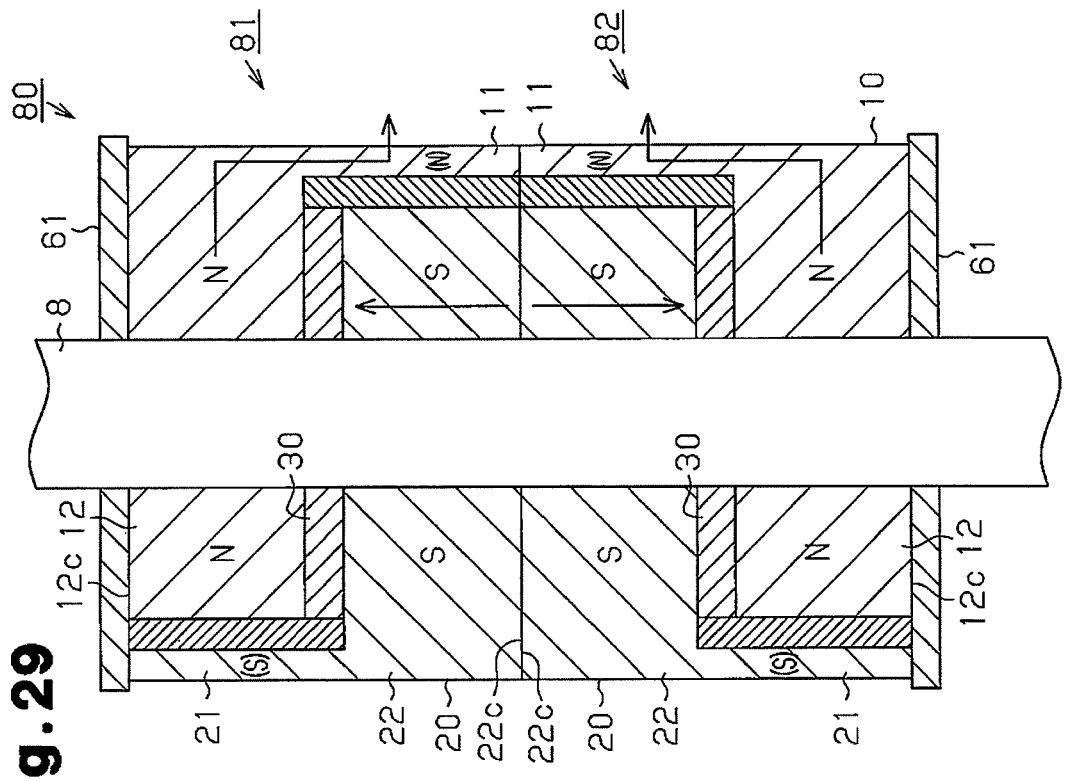
FIG. 29 is a cross-sectional view representing an alternative rotor in which two rotors according to the third embodiment are joined in tandem.

In one alternative, a tandem-structured rotor 80 may be produced by joining two rotors 7 (an upper rotor 81 and a lower rotor 82) according to the earlier-described third embodiment in tandem as depicted in FIG. 29. In this case, the upper rotor 81 and the lower rotor 82 of the tandem-structured rotor 80 share the same first interpole magnets 31a and second interpole magnets 32a.

In this tandem-structured rotor 80, the opposed surface 22c of the second core base 22 of the upper rotor 81 is held in tight contact with the opposed surface 22c of the second core base 22 of the lower rotor 82. Also, a first fixing plate 61 is firmly fixed to both the opposed surface 12c of the first core base 12 of the upper rotor 81 and the opposed surface 12c of the first core base 12 of the lower rotor 82.

This configuration makes it possible to produce the tandem-structured rotor 80 in which the second fixing plate 62 is not placed between the upper rotor 81 and the lower rotor 82.

Figure 30:
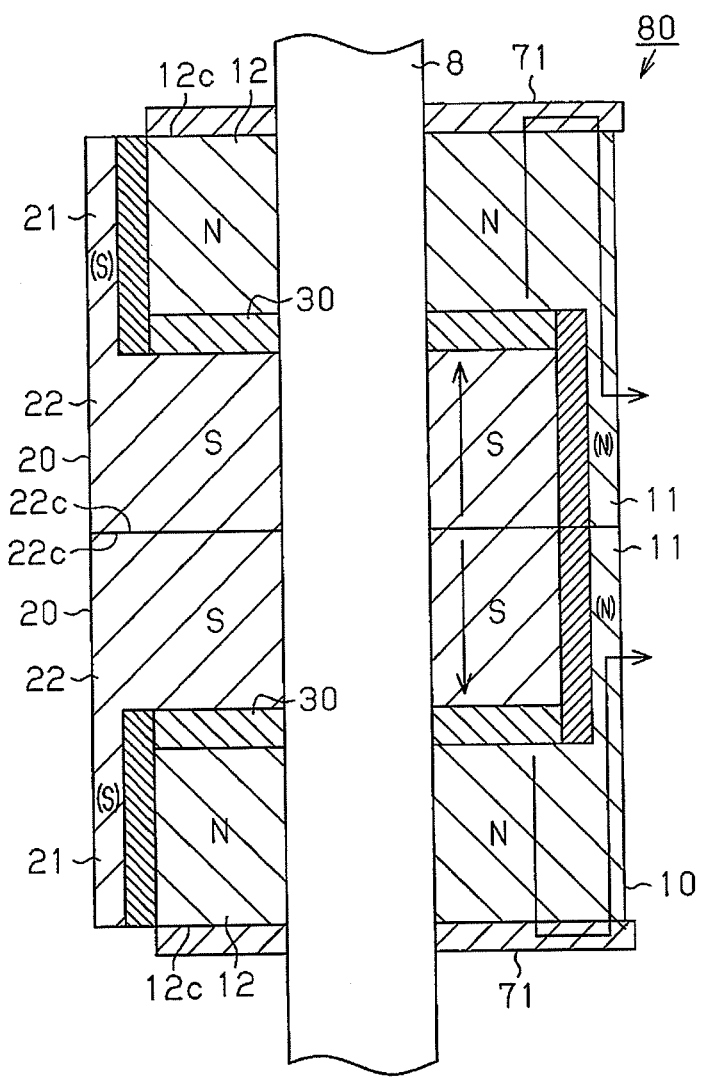
FIG. 30 is a cross-sectional view representing another alternative rotor in which two rotors according to the fourth embodiment are joined in tandem.

In another alternative, a tandem-structured rotor 80 may be produced by joining two rotors 7 (an upper rotor 81 and a lower rotor 82) according to the earlier-described fourth embodiment in tandem as depicted in FIG. 30. In this case, the upper rotor 81 and the lower rotor 82 of the tandem-structured rotor 80 share the same first interpole magnets 31a and second interpole magnets 32a.

In this tandem-structured rotor 80, the opposed surface 22c of the second core base 22 of the upper rotor 81 is held in tight contact with the opposed surface 22c of the second core base 22 of the lower rotor 82. Also, a first fixing plate 71 is firmly fixed to both the opposed surface 12c of the first core base 12 of the upper rotor 81 and the opposed surface 12c of the first core base 12 of the lower rotor 82.

This configuration makes it possible to produce the tandem-structured rotor 80 in which the second fixing plate 72 is not placed between the upper rotor 81 and the lower rotor 82. In this alternative, the first fixing plates 71 may be made of permanent magnets.

The above-described embodiments represented in FIGS. 7 to 30 may be reconfigured such that the stator 5 is provided with a sensor SS arranged to face the individual interpole magnets 31a, 32a serving as auxiliary magnets as depicted in FIGS. 1 and 3 to be able to detect the rotational position of the rotor 7, 80.

The invention claimed is:

1. A rotor comprising:
a first rotor core having a substantially disk-like first core base and a plurality of first claw poles located at equal intervals around an outer circumference of the first core base, the first claw poles projecting radially outward and extending in an axial direction;
a second rotor core having a substantially disk-like second core base and a plurality of second claw poles located at equal intervals around an outer circumference of the second core base, the second claw poles projecting radially outward and extending in the axial direction, wherein the second claw poles are each located between corresponding ones of the first claw poles of the first rotor core;
a field magnet placed between the first core base and the second core base in the axial direction, the field magnet being magnetized in the axial direction so that the first claw poles function as first magnetic poles and the second claw poles function as second magnetic poles; and at least one of a group of one or more auxiliary magnets that are each located between first and second claw poles in a circumferential direction and magnetized to be magnetic poles of the same polarity as the first and second claw poles and another group of one or more auxiliary magnets that are each located on a rear side of the first and second claw poles and magnetized to have radially outer portions of the same polarity as the first and second magnetic poles, wherein the auxiliary magnets are arranged to protrude beyond at least one of axial end surfaces of the first core base and the second core base.

2. The rotor according to claim 1, wherein the auxiliary magnets are interpole magnets each located between first and second claw poles in the circumferential direction and magnetized to be magnetic poles of the same polarity as the first and second claw poles.

3. The rotor according to claim 1, wherein the auxiliary magnets are rear-side magnets located on the rear side of the first claw poles or the second claw poles and magnetized to have radially outer portions of the same polarity as the first claw poles or the second claw poles.

4. The rotor according to claim 1 further comprising a fixing member, wherein the auxiliary magnets each have a portion protruding beyond at least one of the axial end surfaces of the first core base and the second core base, and the fixing member fixes the protruding portions.

5. The rotor according to claim 4, wherein the fixing member is made of plastic and formed by plastic-molding the protruding portions of the auxiliary magnets extending beyond the core base.

6. The rotor according to claim 4, wherein the fixing member is provided only on each of axial end surfaces of the rotor, and the protruding portions extending beyond the core base are fixed by the fixing member.

7. The rotor according to claim 4, wherein the fixing member is a fixing plate and the protruding portions of the auxiliary magnets protruding beyond the core base are fixed by the fixing plate on an axial end surface of the rotor.

8. The rotor according to claim 7, wherein the fixing plate is made of a nonmagnetic material and the protruding portions of the auxiliary magnets extending beyond the core base are fixed by the fixing plate on at least one of axial end surfaces of the rotor.

9. The rotor according to claim 7, wherein the fixing plate is made of a magnetic material and protruding portions of auxiliary magnets extending from the rotor are fixed by the fixing plate on at least one of axial end surfaces of the rotor.

10. The rotor according to claim 9, wherein the fixing plate is made of a magnet and the protruding portions extending from the rotor are fixed by the fixing plate on at least one of the axial end surfaces of the rotor.

11. A tandem-structured rotor formed by stacking a plurality of rotors according to claim 4, wherein the protruding portions of the auxiliary magnets extending between the stacked rotors are fixed by the fixing member.

12. A tandem-structured rotor formed by stacking a plurality of rotors according to claim 4, wherein the protruding portions of the auxiliary magnets extending from the stacked rotors are fixed by the fixing member on least one of axial end surfaces of the rotor.

13. A motor comprising a rotor, the rotor including:
a first rotor core having a substantially disk-like first core base and a plurality of first claw poles located at equal intervals around an outer circumference of the first core base, the first claw poles projecting radially outward and extending in an axial direction;
a second rotor core having a substantially disk-like second core base and a plurality of second claw poles located at equal intervals around an outer circumference of the second core base, the second claw poles projecting radially outward and extending in the axial direction, wherein the second claw poles are each located between corresponding ones of the first claw poles of the first rotor core;
a field magnet placed between the first core base and the second core base in the axial direction, the field magnet being magnetized in the axial direction so that the first claw poles function as first magnetic poles and the second claw poles function as second magnetic poles; and
at least one of a group of one or more auxiliary magnets that are each located between first and second claw poles in a circumferential direction and magnetized to be magnetic poles of the same polarity as the first and second claw poles and another group of one or more auxiliary magnets that are each located on a rear side of the first and second claw poles and magnetized to have radially outer portions of the same polarity as the first and second magnetic poles, wherein
the auxiliary magnets are arranged to protrude beyond at least one of axial end surfaces of the first core base and the second core base, and
the motor further comprises a sensor for detecting the auxiliary magnets.

14. A motor comprising a rotor, the rotor including:
a first rotor core having a substantially disk-like first core base and a plurality of first claw poles located at equal intervals around an outer circumference of the first core base, the first claw poles projecting radially outward and extending in an axial direction;
a second rotor core having a substantially disk-like second core base and a plurality of second claw poles located at equal intervals around an outer circumference of the second core base, the second claw poles projecting radially outward and extending in the axial direction, wherein the second claw poles are each located between corresponding ones of the first claw poles of the first rotor core;
a field magnet placed between the first core base and the second core base in the axial direction, the field magnet being magnetized in the axial direction so that the first claw poles function as first magnetic poles and the second claw poles function as second magnetic poles; and
at least one of a group of one or more auxiliary magnets that are each located between first and second claw poles in a circumferential direction and magnetized to be magnetic poles of the same polarity as the first and second claw poles and another group of one or more auxiliary magnets that are each located on a rear side of the first and second claw poles and magnetized to have radially outer portions of the same polarity as the first and second magnetic poles,
wherein the auxiliary magnets are arranged to protrude beyond at least one of axial end surfaces of the first core base and the second core base.

* * * * *